United States Patent [19]

Mason et al.

[11] Patent Number: 5,488,632
[45] Date of Patent: Jan. 30, 1996

[54] TRANSMISSION AND RECEPTION IN A HOSTILE INTERFERENCE ENVIRONMENT

[75] Inventors: Arthur G. Mason, Andover; Jeffrey J. Gledhill, Chandlers Ford, both of England

[73] Assignee: National Transcommunications Limited, Winchester, England

[21] Appl. No.: 940,874

[22] PCT Filed: Apr. 2, 1991

[86] PCT No.: PCT/GB91/00513
§ 371 Date: Oct. 29, 1992
§ 102(e) Date: Oct. 29, 1992

[87] PCT Pub. No.: WO91/15925
PCT Pub. Date: Oct. 17, 1991

[30] Foreign Application Priority Data

Mar. 30, 1990 [GB] United Kingdom .................. 9007141
Sep. 14, 1990 [GB] United Kingdom .................. 9020169
Sep. 14, 1990 [GB] United Kingdom .................. 9020170

[51] Int. Cl.$^6$ .................. H04K 1/10; H04L 27/28
[52] U.S. Cl. .................. 375/260; 375/281; 375/308; 375/348; 370/21
[58] Field of Search .................. 375/77, 75, 80, 375/99, 101, 102, 37, 38, 27, 58, 60, 104; 370/21, 69.1, 70, 19, 20; 348/398, 607, 608

[56] References Cited

U.S. PATENT DOCUMENTS

| | | | |
|---|---|---|---|
| 4,881,241 | 11/1989 | Pommier et al. | 375/38 |
| 4,884,139 | 11/1989 | Pommier | 358/142 |
| 4,928,288 | 5/1990 | D'Aria et al. | 375/104 |
| 5,053,860 | 10/1991 | Tsinberg | 348/437 |
| 5,063,574 | 11/1991 | Moose | 375/27 |

FOREIGN PATENT DOCUMENTS 0278192 8/1988 European Pat. Off. .

OTHER PUBLICATIONS

EBU Review, No. 224, Aug. 1987, (Brussels, BE), M. Alard et al.: "Principles of modulation and channel coding for digital broadcasting for mobile receivers", pp. 168–190, see sections 1, 2.1, 2.2; FIGS. 1, 2.

Wescon Conference Record, vol. 24, Anaheim, Calif., US, 16–18 Sep. 1980, U. A. von der Embse: "High dynamic range FFT processors for multiple channel receivers" pp. 5/4 1–13, see abstract; introduction; p. 5/4.3 left–hand col., lines 29–53; FIGS. 2, 3, 12–14.

IEEE Transactions on Consumer Electronics, vol. 35, No. 3, Aug. 1989, (New York, US), B. Le Floch et al.: "Digital sound broadcasting to mobile receiver", pp. 493–503, see sections 1, 4, 7.

IEEE Global Telecommunications Conference & Exhibition Conference Record, Dallas, Tex., US, 27–30 Nov. 1989, IEEE (New York, US), J. C. Rault et al.: "The coded orthogonal frequency division multiplexing (COFDM) Technique, and its application to digital radio broadcasting towards mobile receivers", pp. 428–432.

Primary Examiner—Stephen Chin
Assistant Examiner—Don Vo
Attorney, Agent, or Firm—Watson, Cole, Grindle & Watson

[57] ABSTRACT

A low power OFDM signal may be transmitted in an environment where it is subject to interference from other transmissions, e.g. broadcast television services. In a receiver interference is reduced by ignoring information modulating OFDM carriers at the frequencies corresponding to the carriers of the interfering transmissions; adjacent channel interference is reduced by ignoring data on OFDM carriers at the band edges and interference from third order intermodulation products is reduced by the ignoring OFDM carriers affected. Image channel interference is reduced by using an intermediate frequency for a first mixing process in the receiver such that the image channel interference affects OFDM carriers at frequencies which are already being ignored by the receiver. Preferably no data is modulated onto OFDM carriers which are to be ignored by the receiver. Preferably the modulation of the OFDM carriers is arranged so as to produce a real baseband representation of the OFDM signal.

25 Claims, 19 Drawing Sheets

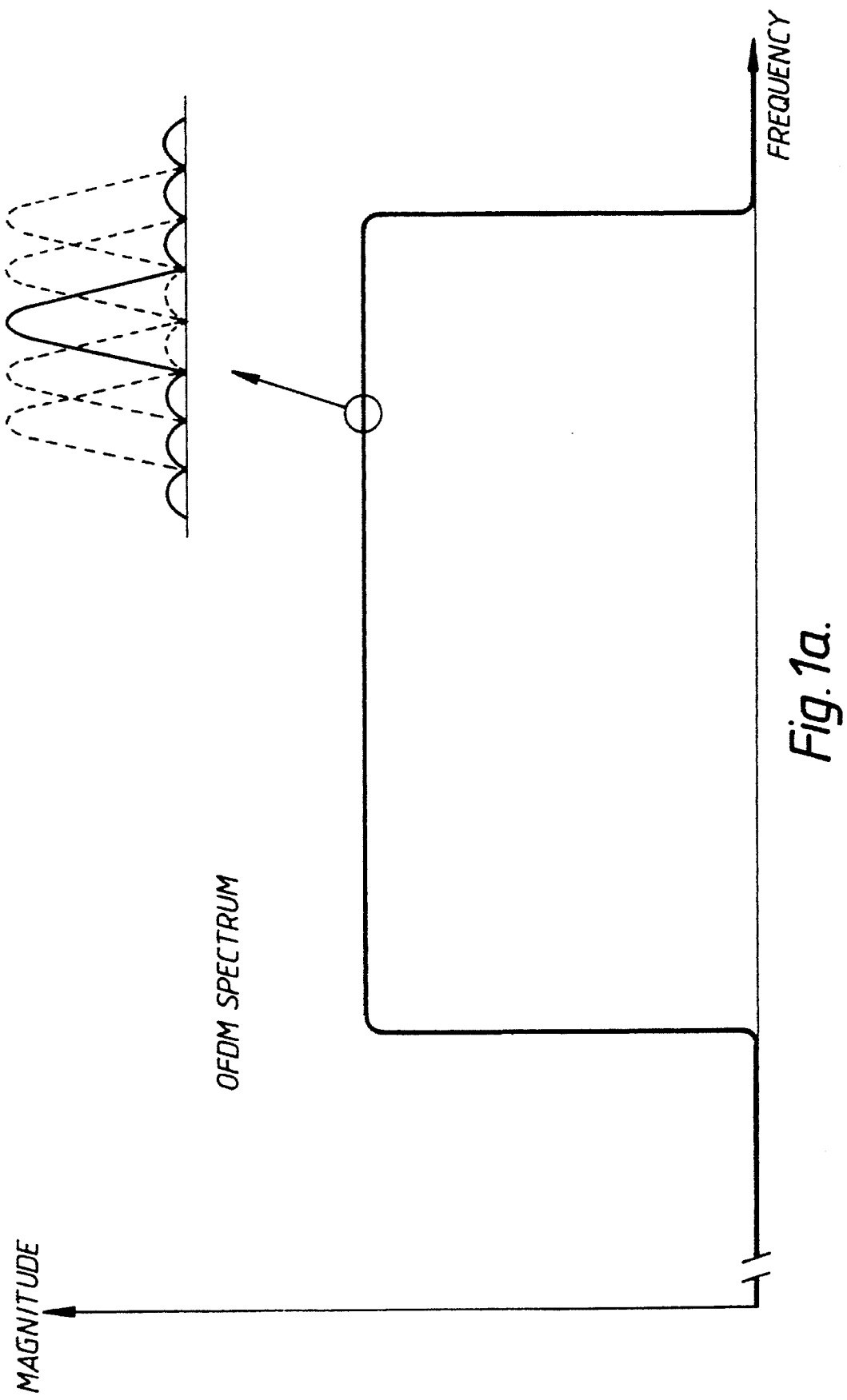

E.G. INITIAL STATE = +1+j

| DATA | TRANSITION | FINAL STATE |
|------|------------|-------------|
| 00   | 0°         | +1+j        |
| 10   | 90°        | -1+j        |
| 11   | 180°       | -1-j        |
| 01   | 270°       | +1-j        |

DIFFERENTIAL CODER USING A PROM

TRANSMISSION AND RECEPTION IN A HOSTILE INTERFERENCE ENVIRONMENT

BACKGROUND OF THE INVENTION

1. Field of the Invention

This invention relates to the transmission and reception of information and particularly to the transmission and reception of information in digital form at frequencies which are hostile from the point of view of interference from other signals. More particularly, the invention is described in relation to transmitting in or close to the frequency bands of existing ultra-high frequency (UHF) TV signals.

2. Related Art

There exist channels in the UHF TV Spectrum which are not used as part of the frequency planning rules—these are known as the "taboo" channels. To understand these taboo channels it is necessary to have a brief understanding of the way in which the UHF TV band is planned.

The following description is given in the context of the frequency plan adopted in the United Kingdom. It will be understood by a person skilled in the art that, for similar reasons to those discussed below, taboo channels exist in the frequency plans of other countries and that the techniques described below for avoiding interference in a new low power service in a taboo channel may be applied in those countries also (with suitable alterations taking into account the different respective channel bandwidths/channel spacings and sub-carrier frequencies in those countries).

The frequency plan in the United Kingdom consists of 51 main transmitter stations covering some 90% of the population using horizontal polarisation. There then exists 950 small low power relay stations filling the main coverage gaps these use vertical polarisation. Each main transmitter station has a certain coverage area and needs perhaps 20 relay stations for gap filling.

The relay stations in a given coverage area of a single main station have restrictions on the frequencies to which they may be assigned because of the frequency planning taboos. Some of the taboos came about as the result of limited technology when the original UHF plan was designed back in 1961.

In the United Kingdom television channels are assigned 8 MHz segments of the frequency spectrum. If it is desired to broadcast television signals in channel number N, then a first pair of taboo channels (adjacent) arise at channel numbers N±1 because, with receiver technology as it was in 1961, the receiver filters accepting channel N could not reject frequencies used by channels N±1. Two other pairs of taboo channels (local oscillator and image channel) also arise at channels numbers N±5 and N±9 respectively because of the heterodyning process used to demodulate received television signals. If a first receiver were to receive a broadcast signal at one of channels numbers N±5 then during the demodulation process frequencies would be generated at the receiver which would propagate and could interfere with operation of a nearby receiver attempting to demodulate a broadcast signal at channel number N.

There is now interest in exploiting these taboo channels in a way which does no cause interference to the existing television service. The present invention may be utilized for this purpose. More generally, the invention may be applied to enable the transmission of relatively low power signals in frequency bands subject to interference from other transmissions.

Transmissions in the taboo channels may take place without causing interference to existing relay stations in surrounding coverage areas which use the same frequencies providing very low power transmissions are used in the taboo channels. This criterion can be met by using digital modulation which enables transmitter power to be very much reduced without significantly reducing the coverage area. Typically, a digital signal may be transmitted using the methods of the present invention with 30 dB less power for approximately the same coverage as analogue amplitude modulation (AM). However, when sharing the UHF band at such low levels of transmitted power the digital signal is very vulnerable to interference from the much higher power levels of the existing services.

A proposal has been made in European patent application EP-A-0278192 to transmit digital data in the same channel as a conventional television signal. In this proposal the data to be transmitted is used to modulate the carriers of an orthogonal frequency division multiplex OFDM signal. Interference of the television signal into the OFDM signal is reduced by using a frequency offset technique. This technique relies on the fact that the energy in the frequency spectrum of a conventional television signal is centered around multiples of the line frequency 15625 Hz. The carriers of the OFDM signal are conditioned to exist only at frequencies which are offset from the line repetition "harmonic" frequencies of the existing television signal.

There is a finer repetitive structure to the conventional television signal spectrum arising because of the frame repetition rate 25 Hz. EP-A-0278192 also proposes a precision offset technique in which the carriers of the OFDM signal are conditioned to exist only at frequencies which are offset from these frame repetition "harmonic" frequencies.

Offset and precision offset techniques are well-known for use in reducing interference between broadcast television signals. For example, television transmitters broadcasting the same channel are arranged to broadcast their signals at frequencies offset from one another so that the line structure of one spectrum interleaves with that of the other. See EBU technical document 3254. However when contemplating applying an offset technique to an OFDM signal there is a difficulty.

When reference is made to an OFDM signal the image generally brought to mind is of a signal including orthogonal carriers overlapping by 50%, such as that having a power spectrum as illustrated in FIG. 1a. With such a signal the overall data transmission rate for the full channel bandwidth almost reaches the ideal Nyquist rate (see U.S. Pat. No. 3,488,445 in the name of Chang). It may be seen from FIG. 1b that such a signal containing overlapping carriers cannot be interleaved with a conventional television signal.

In order to implement an offset or precision offset technique using an OFDM signal it is proposed in EP-A-0278192 to dispense with overlapping OFDM carriers and instead to use a set of carriers spaced apart from one another and each having a narrower width of the carrier peak. Such an OFDM signal may be used in an offset or precision offset technique as illustrated by FIG. 1c.

The above system has the disadvantage that the overall data transmission rate of the OFDM signal is drastically reduced compared with the theoretical maximum. Furthermore, if a precision offset technique is used then the frequencies of the OFDM carriers must be very precisely locked to the carrier frequency of the interfering television signal.

SUMMARY OF THE INVENTION

The present invention is based on a different principle from that described above. The present invention seeks to identify particular individual frequencies of the interfering signal which cause the worst interference problems for the proposed new signal and to either prevent this interference by cutting out of the new signal the frequencies that would be affected and/or to reduce the effect of the interference by conditioning a receiver to reject data transmitted at affected frequencies.

Where the interferer is a conventional television signal there are two main components that present continuous high power interfering elements which would affect the proposed transmissions taking place, for example, in the taboo channels, these are the vision carrier and the sound carrier. Although the colour sub-carrier and the digital sound sub-carrier are also present, these are reduced in level by the dispersal effect of their modulating signals. Hence, these sub-carriers have a similar energy level to the vision modulation which has much less peak power than the vision and sound carrier levels and thus does not present such an interference problem. The techniques of the invention may nevertheless be applied to reduce the effects of interference from the colour and digital sound sub-carriers if it is desired.

It follows that a conventional broadcast television signal may be approximated to a spectrum consisting of two continuous wave tones (CW), with the vision carrier at 0 MHz in the baseband and the sound carrier at 6 MHz in the baseband in the United Kingdom. This is shown in FIG. 2.

Transmissions from a given transmission site in the U.K. will resemble four pairs of CW signals as shown in FIG. 3. The pairs of CW signals will always be spaced apart by an integer multiple of 8 MHz in the United Kingdom since successive channel numbers are spaced apart by 8 MHz. Given this property of the interferer it is possible to design the wanted digital channel, which is the interference victim, to resist the interference tones. This will enable the digital signal to be capable of transmission at a level of 30 dB less than the existing TV service. Principal modes of interference are as follows:

(i) co-channel interference (ii) adjacent channel interference (iii) image channel interference (iv) third order intermodulation products.

In order to be able to reject interfering tones it is useful to have a wanted signal spectrum of a type such that pieces can be cut out at frequencies where the interferers fall.

A likely candidate is the usual orthogonal frequency division multiplexed signal spectrum (OFDM) which may be made up of a large number of overlapping modulated carriers as shown in FIG. 1a. Typically 512 overlapping carriers might be transmitted each modulated with a low data rate signal using say quadrature phase shift keying (QPSK). The total bit rate of the signal is the number of carriers times the bit rate per carrier. The resulting OFDM spectrum is rectangular and is an excellent approximation to a noise signal.

If an interfering tone falls on a few OFDM carriers, these carriers may be arranged to be ignored by the receiver, provided the interferer is in a known position in the spectrum. Hence, the receiver cuts out a small portion of the received spectrum by eliminating the information from the affected carriers. Since the carriers suffering interference are not to be processed by the receiver, it is not necessary to transmit them— hence the spectrum may be transmitted with cut out portions if desired. The advantage in providing the cut outs on transmission is that a very small power saving occurs and interference of the OFDM signal into the other existing transmission, e.g. a television signal, is slightly reduced.

Preferably, therefore, no useful information is broadcast on the carriers which will be affected by interference. The relevant data which would normally have been transmitted on the OFDM carriers affected by interference either omitted or is simply translated so as to modulate OFDM carriers at other frequencies.

However, it is also possible to use the OFDM spectrum in this environment by duplicating the "lost" data at one or more other frequency locations in the OFDM signal. Alternatively, if useful information is modulated onto all of the OFDM carrier frequencies without translation or duplication, known methods of data reconstruction may be employed at the receiver to regenerate that data which is lost by the ignoring of specific frequencies from the received data.

BRIEF DESCRIPTION OF THE DRAWINGS

Example embodiments of the invention will be described with reference to the accompanying drawings in which:

FIG. 1a illustrates the power spectrum of an Orthogonal Frequency Division Multiplex (OFDM) signal;

DETAILED DESCRIPTION

As mentioned above there are four principal types of interference likely to affect a low power transmission:

i) co-channel interference, ii) adjacent channel interference, iii) image channel interference, and iv) third order intermodulation products.

The description below of methods for handling these types of interference is given in terms of the TV transmission frequency plan in the UK. For TV transmission elsewhere there will be different channel bandwidths and vision and sound carrier frequencies so the values in the calculations will differ. For other types of interfering signal, e.g. radio transmissions, appropriate changes will be needed in the calculations so as to take into account the different carrier frequencies etc.

Also, particular frequencies within a broadcast band are often referred to below as e.g. 6 MHz. In relation to existing television services it will be understood that these numerical values are referenced to the channel carrier frequency, $F_o$, and so 6 MHz really indicates $F_o+6$ MHz in the broadcast signal. The actual numerical values will be correct when considering the baseband signal before its modulation up to the desired broadcast channel frequency. In relation to the OFDM signal "6 MHz" indicates the frequency which if a TV signal occupied the channel would be $F_o+6$ MHz. Since TV signals in the UK are transmitted in vestigial sideband form this frequency will be more than 6 MHz above the lowest frequency present in the OFDM signal.

Figure 4:
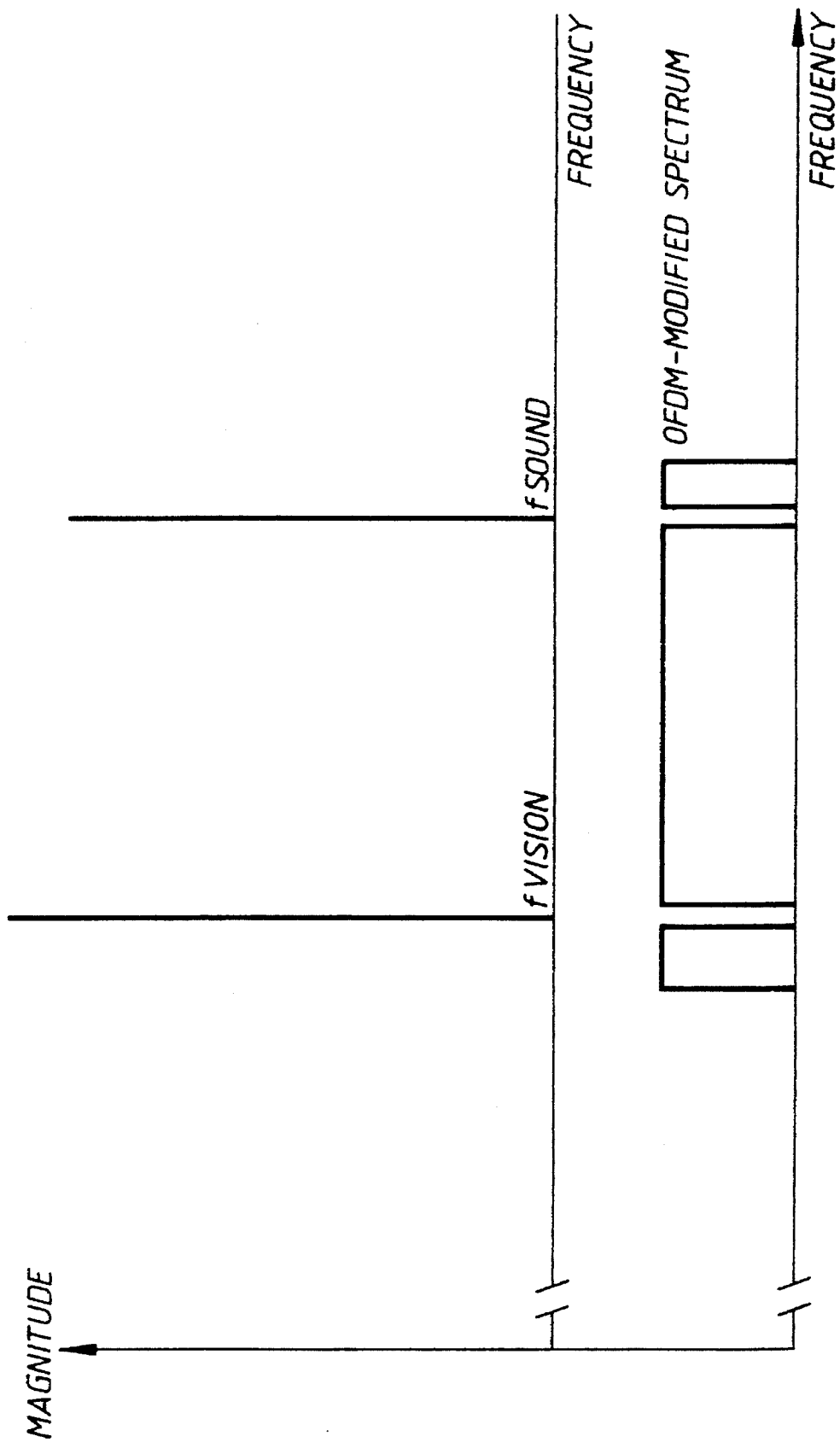
FIG. 4 is illustrative of co-channel interference.

Straight co-channel interference where a signal according to the invention is transmitted in the same channel, for example, as a conventional TV signal is shown in FIG. 4. If two slots are cut out in the OFDM spectrum, one at the vision carrier position (0 MHz) and one at the sound carrier position (6 MHz), the level of interfering TV signal that may be tolerated may be increased by some 30 dB, compared to the case of not having slots in the OFDM spectrum. Hence, a very large improvement in the level of co-channel interference from a TV signal is gained by slots in the OFDM signal at 0 and 6 MHz.

For other co-channel interferers of the type where the modulation is substantially continuous and causes a much less significant interference problem than does the carrier, slots may be created in the OFDM spectrum at locations corresponding to the or those carrier frequencies.

In relation to adjacent channel interference, often a large signal in the adjacent channel will have spectral components that spill over into the next channel. The OFDM receiver may be arranged to ignore a small number of carriers at the edges of the spectrum in order to eliminate the effect of adjacent channel interference caused by partial blocking. The transmitted OFDM spectrum may be trimmed at the edges in order to omit carriers at the frequencies likely to experience adjacent channel interference and be ignored by the receiver.

Image channel interference arises as explained below.

A superheterodyne receiver tunes to a particular UHF channel by means of a local oscillator (LO) and mixes the signal down to a fixed intermediate frequency (IF). As a consequence of the first mixing stage an image channel is also mixed down into the IF band. The image channel can be thought of as a channel which folds into the wanted channel at I.F. with its spectrum reversed. For conventional television transmissions in the UK the wanted channel is at the UHF frequency which is the LO–IF and the image channel is at the UHF frequency which is LO+IF. Normally an image rejection filter is used at the front end of the receiver which has to be tuned with the LO. However, the rejection offered by a typical, low-cost image filter is insufficient to remove a TV signal interferer which is 30 dB above the OFDM signal. However, if the vision and sound carriers of the TV signal can be made to fall into the OFDM slots already created or envisaged at 0 and 6 HMz then the rejection of the unwanted image will be vastly improved. This can be achieved by suitable choice of IF frequency for the OFDM receiver and will cause the sound carrier image to fold back into the 0 MHz slot and the vision carrier notch to fold back into the 6 MHz notch. This is shown in FIG. 5.

Figure 5:
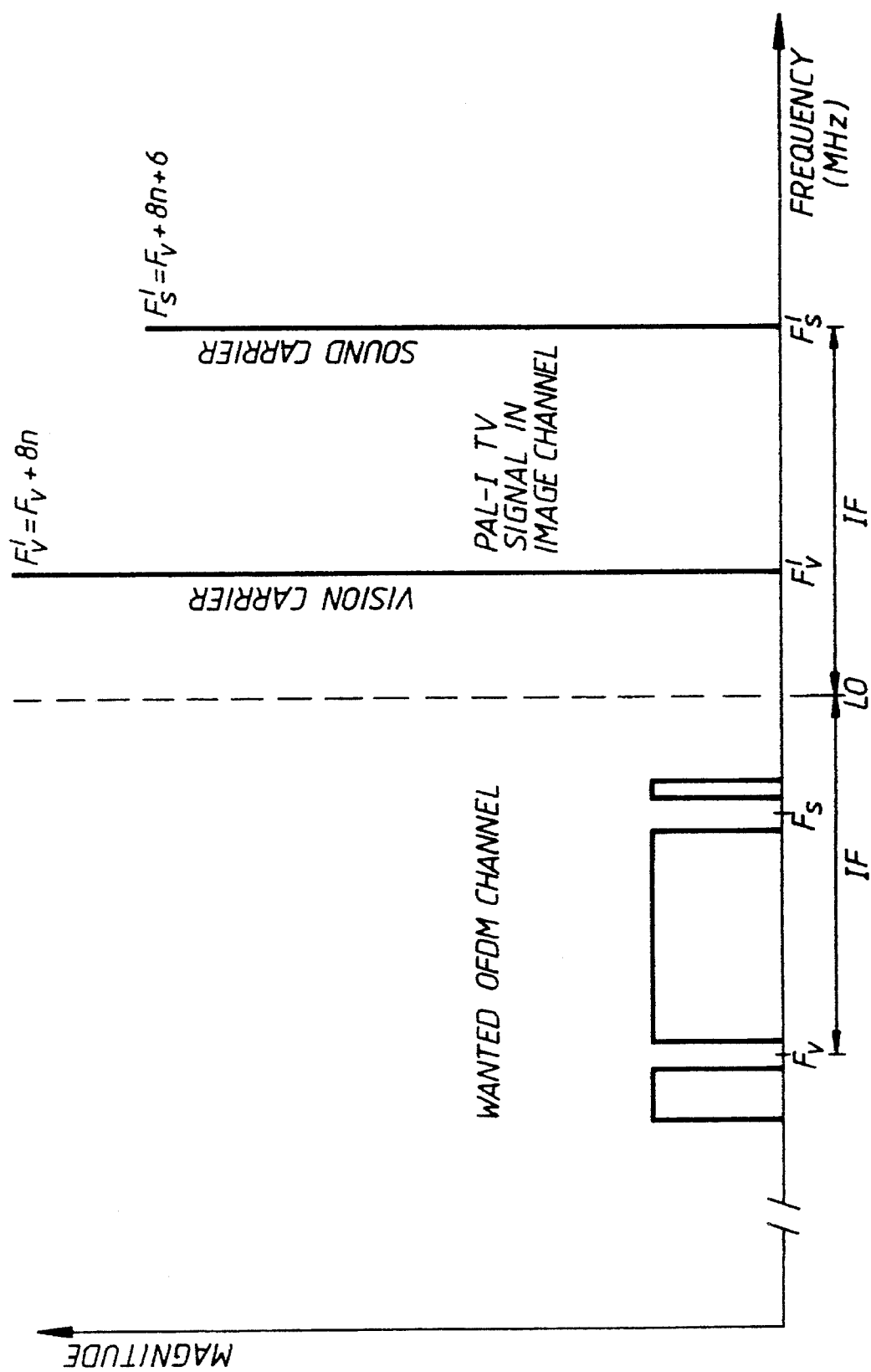
FIG. 5 is illustrative of image channel interference.

From FIG. 5, the image channel is n channels above the wanted channel and each channel is 8 MHz wide in the UHF band.

Hence $F'_v=F_v+8$ n (MHz) and $F_s=F_v+8$ n+6 (MHz)

The condition for the image channel to fold back into the OFDM holes at $F_v$ and $F_s$ is when $$\begin{aligned} F_v + 2IF &= F'_s \\ &= F_v + 8n + 6 \\ 2IF &= 8n + 6 \\ IF &= 4n + 3 \text{ (MHz)} \end{aligned}$$

the IF frequency can be any value which satisfies the above equation with n an integer. The most convenient value of n=9 gives:

$$\begin{aligned} IF &= 4 \times 9 + 3 \\ &= 39 \text{ MHz} \end{aligned}$$

An IF frequency of 39 MHz is very close to the standard values of 38.9 and 39.5 MHz currently used for television in the UK and a 38.9 MHz SAW IF filter may be used for OFDM without modification.

Although the discussion of how to tackle image channel interference has been cast in terms of selecting a local oscillator frequency for a first mixing stage in the receiver such that the image channel carrier or carriers is/are folded into notches that have been provided in the OFDM spectrum to reduce co-channel interference it will be understood that the important factor is to cause the image channel carrier(s) to affect portions of the OFDM signal that are already affected by other types of interference and that the receiver should already be disregarding. Thus it does not matter if the image channel interferers are folded into locations where no notch as such is actually provided (i.e. useful data has in fact been modulated onto OFDM carriers at the frequencies which the receiver will ignore).

When the new OFDM service is transmitted in the adjacent channels at 30 dB less power than the existing TV service, problems may arise because intermodulation products (IP) of the existing services may fall in the OFDM band at similar levels to the OFDM signal. This section analyses where the intermodulation products will fall in the OFDM spectrum when there are any number of television channels spaced multiples of 8 MHz apart, and gives the number of possible intermodulation products. Intermodulation products might be caused in the receiver by the low noise front end amplifier non-linearities—these cause principally 3rd order intermodulation products. FIG. 6b shows a typical arrangement of four incoming UHF TV channels with the new OFDM signal transmitted from the same mast at a power level 30 db lower than the existing services. The new signal may even be transmitted from the same mast.

If the transfer function of a non-linear device is given by the following equation:

$$Y=K_1F(t)+K_2(F(t))^2+K_3(F(t))^3+ \ldots$$

then the third order intermodulation products are generated by the term $K_3(F(t))^3$ when $F(t)=A \sin 2\pi F_1 t + B \sin 2\pi F_2 t + \ldots N \sin 2\pi F_n t$ the input signal has n carriers which can be written in a shorthand form as $$a = A \sin 2\pi F_1 t, \quad b = B \sin 2\pi F_2 t \ldots$$
$$n = N \sin 2\pi F_n t$$
$$\text{then } (F(t))^3 = (a+b+c+d+\ldots l+m+n)^3$$
$$= (a^3 + b^3 + C^3 + d^3 + \ldots n^3)$$
$$+ 3(ab^2 + ac^2 + a^2 b + \ldots l^2 n + n^2 l)$$
$$+ 6(abc + abd + acd + \ldots lmn)$$

(i) the first line has IPs of the form $x^3$ which correspond to out of band IPs given by $3F_x$. These can be ignored.

(ii) the second line has IPs of the form $x^2 y$ which give rise to IPs generated from two of the n input frequencies $F_x$ and $F_y$ and IPs at $$IP = 2F_x - F_y$$

(iii) the third line has IPs of the form xyz which give rise to IPs generated from three of the n input frequencies $F_x$, $F_y$, $F_z$ and generate IPs at:

$$IP = F_x + F_y - F_z$$

(iv) the first set of IPs of form $(2F_x - F_y)$ have a multiplying coefficient of 3 whereas the second set of IPs have a multiplying coefficient of 6 which causes the $(F_x + F_y - F_z)$ IPs to be twice as large as the $(2F_x - F_y)$ IPs. Hence for equal magnitude input carries the $(F_x + F_y - F_z)$ IPs are 6 dB greater than the $(2F_x + F_y)$ IPs.

This is an important point to note as IPs caused by three frequencies are more significant than those caused by only two frequencies, they are of course only present when three or more input frequencies are present, i.e. $n \geq 3$.

The number of IPs generated from n input carriers can be found from the theory of permutations.

Consider a set of n objects (a,b,c,d, ... n) the number of different ways of choosing r objects from the set of n objects is given by:

$$^nP_r = \frac{n!}{(n-r)!}$$

Hence IPs given by two frequencies chosen from a set of n input frequencies generate $$\frac{n!}{(n-2)!}$$

intermod products.

Consider now the equation $(F_x + F_y - F_z)$, the number of IPs generated is $$\frac{n!}{(n-3)!}$$

because there are 3 frequencies chosen from the n frequency input set. However, since the permutation $(F_x + F_y - F_z)$ and the permutation $(F_y + F_x - F_z)$ generate the same IP frequency the number of IPs actually generated is halved, and is:

| IP Frequency | Number of IPs $\frac{n!}{2(n-3)!}$ | Magnitude of each IP |
|---|---|---|
| $2F_x - F_y$ | $\frac{n!}{(n-2)!}$ | $KX^2 Y$ |
| $F_x + F_y - F_z$ | $\frac{n!}{2(n-3)!}$ | $2KXYZ$ |

TABLE 1 INTERMODULATION PRODUCTS GENERATED FROM N INPUT CARRIERS

Where K is some constant caused by the non-linearity and can be determined from the 3rd Order Intercept point of the device. X is the magnitude of $F_x$, Y is the magnitude of $F_y$ and Z is the magnitude of $F_z$. $F_x$, $F_y$ and $F_z$ are any three frequencies chosen from an n frequency input set.

Figure 6:
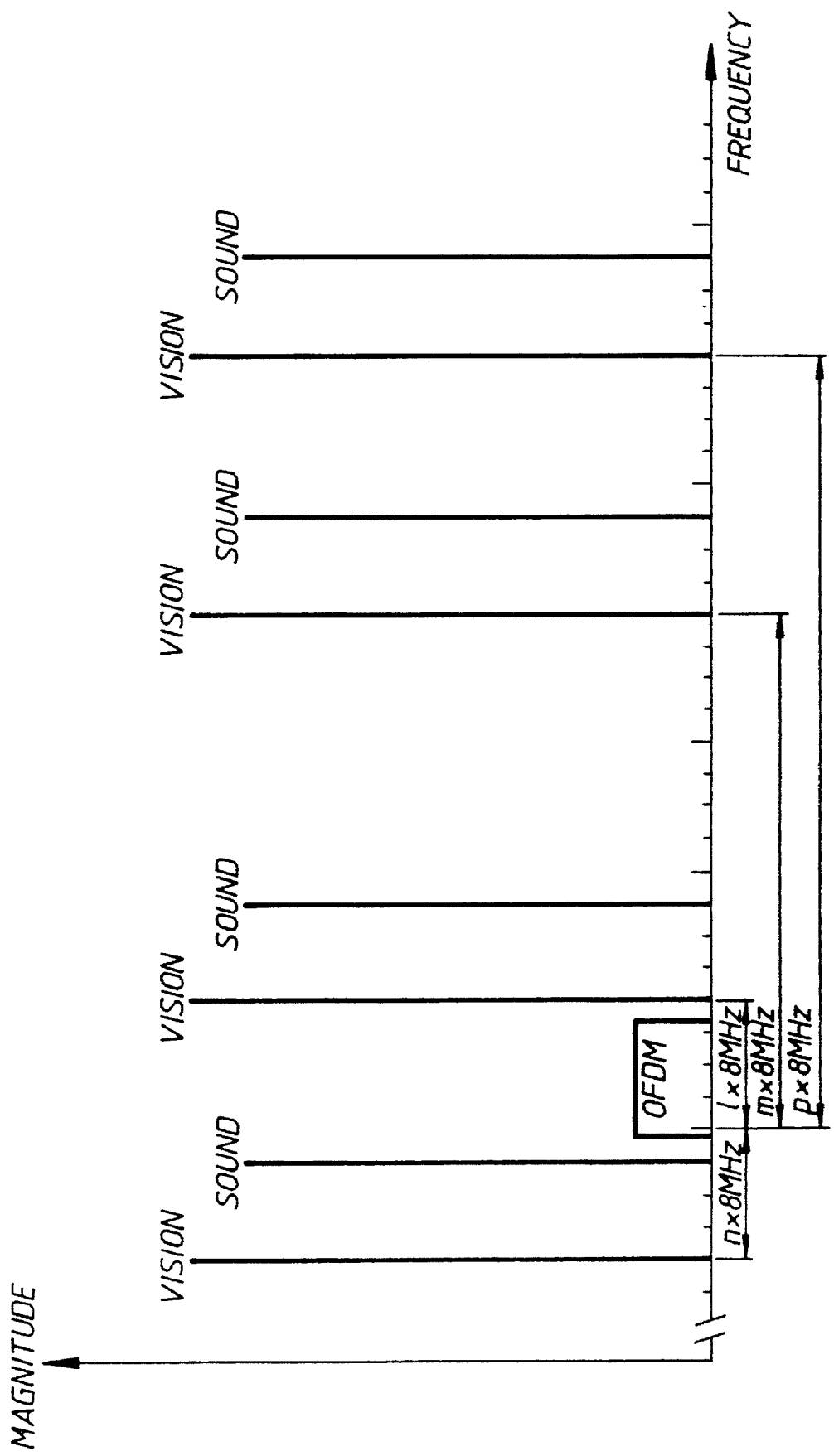
FIG. 6 shows the spectrum of FIG. 3 with an OFDM spectrum added.

FIG. 6 shows a typical spectrum of incoming signals to an OFDM receiver front end. Four TV channels consisting of a vision and sound carrier are shown which are spaced integer multiples of 8 MHz apart. Since the vision and sound carrier of a channel are spaced 6 MHz apart it is convenient to show the carrier sitting on a 2 MHz grid, which is the lowest common multiple of 8 MHz and 6 MHz. The OFDM signal is 30 dB down on the vision carrier and for the purpose of the analysis sits in one of the possible channels—in this case an adjacent channel. However, the analysis is not dependent in which channel the OFDM signal sits provided $F_o$, the nominal position of the vision carrier in that channel, is an integer of 8 MHz away from each vision carrier of the other TV signals.

Intermodulation products will occur at:
(i) $IP = 2F_x - F_y$
(ii) $IP = F_x + F_y - F_z$ where x, y and z are any of the carriers shown in FIG. 6. Since all carriers are on a 2 MHz spacing and referring all frequencies to the datum frequency $F_3$:

$F_x = F_o + 2l$ (MHz)
$F_y + F_o + 2m$ (MHz)
$F_z = F_o + 2n$ (MHz)

The 2 is the 2 MHz spacing and l, m and n are integers that give the distance of $F_x$, $F_y$ and $F_z$ from the datum frequency $F_o$ in 2 HMz steps. The integers may be positive or negative.

Hence IPs are generated at the following frequencies:

$$\begin{align}
IP &= 2F_x - F_y \quad \text{(double frequency IPs)} \\
&= 2(F_o + 2l) - (F_o + 2m) \\
&= F_o + 4l - 2m \\
&= F_o + 2(2l - m)
\end{align}$$

since (2l-m) is just another integer, say K, then $IP = F_o + 2K$ (MHz)

Furthermore:

$$\begin{align}
IP &= F_x + F_y - F_z \quad \text{(Triple frequency IPs)} \\
&= (F_o + 2l) + (F_o + 2m) - (F_o + 2n) \\
&= F_o + 2(l + m - n)
\end{align}$$

since (l+m−n) is just another integer, say K, then:
$IP = F_o + 2K$ (MHz)

Hence all IPs generated from any of the input carriers can only fall at integer multiples of 2 MHz. Therefore, the position of the IPs in the OFDM spectrum can only be at the following frequencies:

$F_o$ (MHz) position of vision carrier $F_o+2$ (MHz)

$F_o+4$ (MHz)

$F_o+6$ (MHz) position of sound carrier

In practice the actual number of IPs falling at these four frequencies will vary depending on the position of the TV channels relative to the OFDM spectrum. However, this analysis shows the upper limit to the position of all the possible 3rd order intermodulation product from any number of incoming TV channels. Hence, from the above theory placing cut-outs in the OFDM spectrum at 0, 2, 4 and 6 MHz will prevent interference from 3rd order IPs.

The OFDM spectrum with information eliminated at the nominal position of the vision carrier 0 MHz, at 2 MHz and 4 MHz and the nominal position of the sound carrier 6 MHz is able to resist a variety of interferers. By means of this strategy, interference from co-channel, image channel and 3rd order intermodulation product may be rejected. The image channel rejection requires a correct choice to be made for the IF frequency. Adjacent channel overlapping interferers may be rejected by removing information at the edges of the OFDM spectrum.

There is an additional advantage to removing information at the low frequency (d.c.) edge of the OFDM baseband spectrum. Having no energy at d.c. allows a.c. coupled amplifiers to be used in the signal processing.

Figure 7:
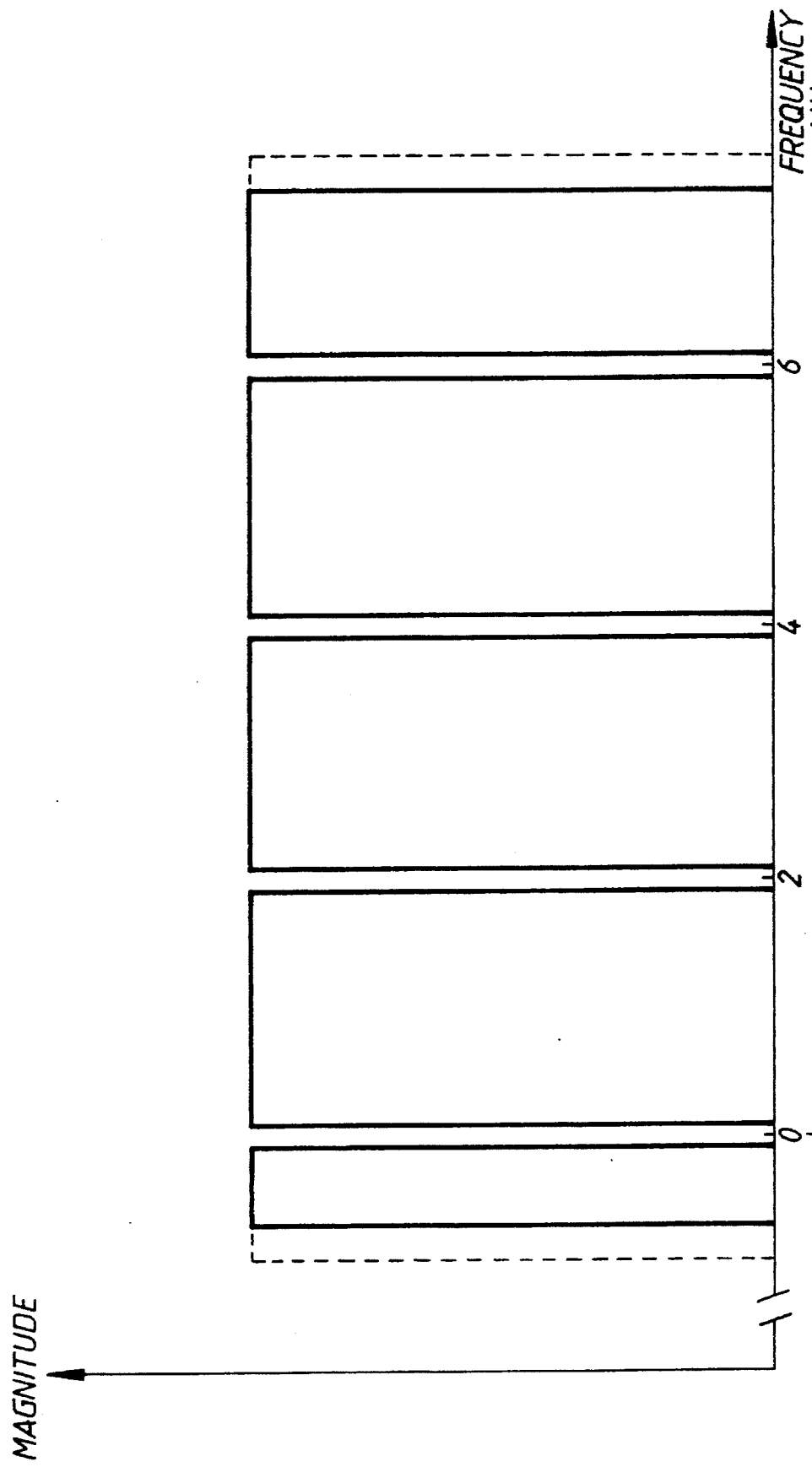
FIG. 7 shows a possible final OFDM spectrum according to the present invention.

Hence the OFDM spectrum with novel conditioning lends itself to broadcasting in a very hostile interference environment. The resulting OFDM spectrum is shown in FIG. 7.

Figure 1B:
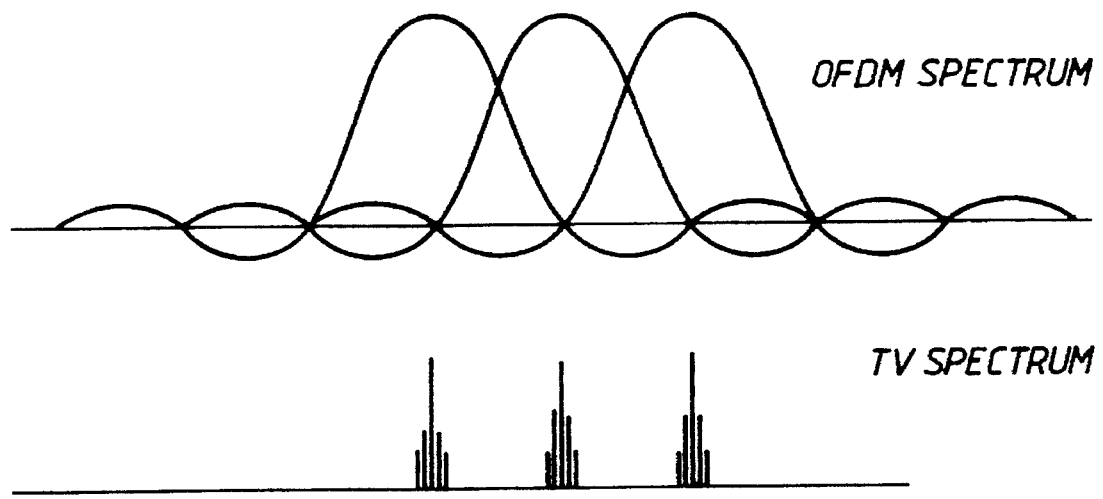
FIG. 1b compares the spectrum of an OFDM signal with the spectrum of a conventional television signal.
Figure 1C:
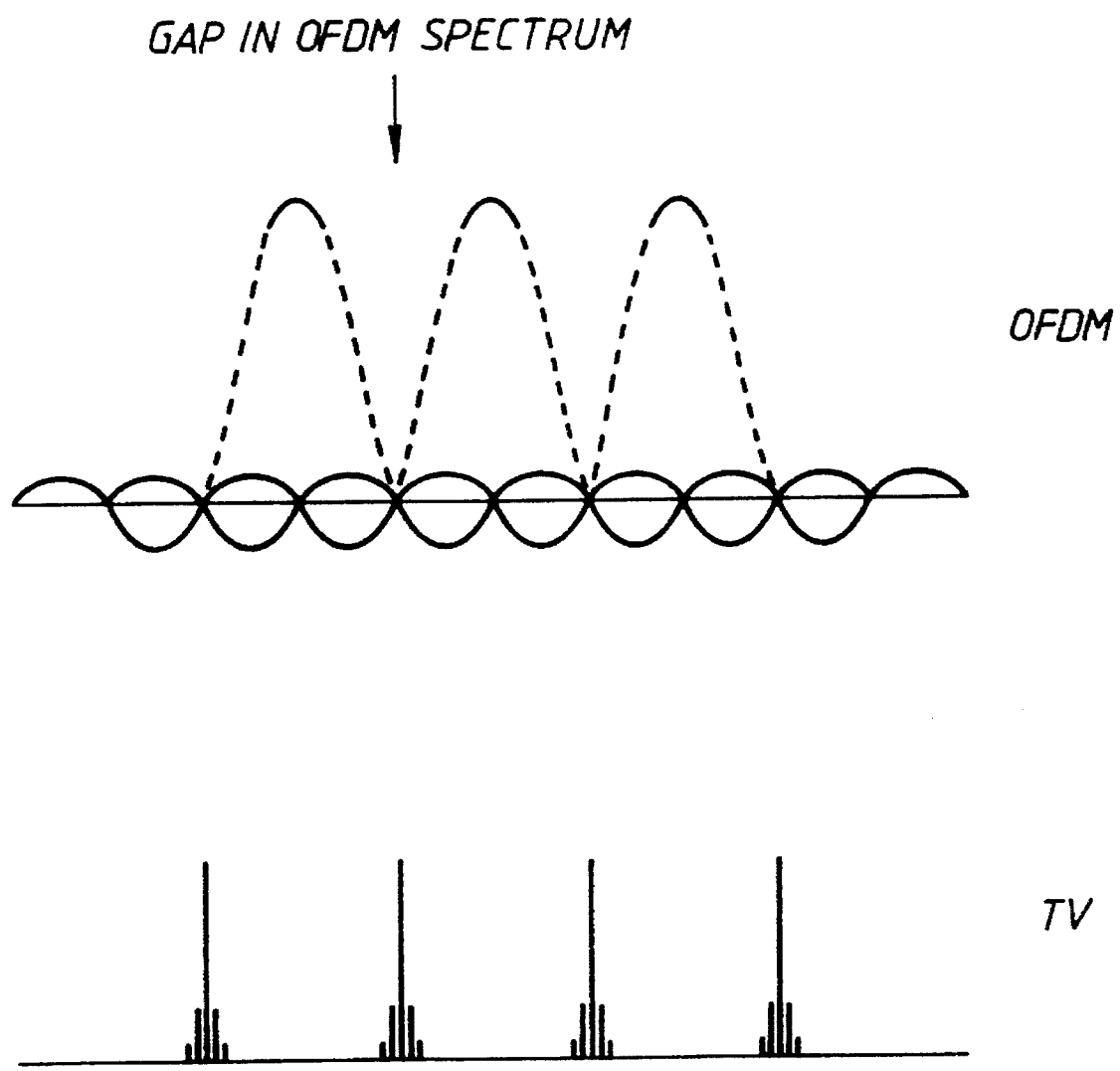
FIG. 1c compares the spectrum of a specially conditioned OFDM signal with the spectrum of a conventional television signal.
Figure 2:
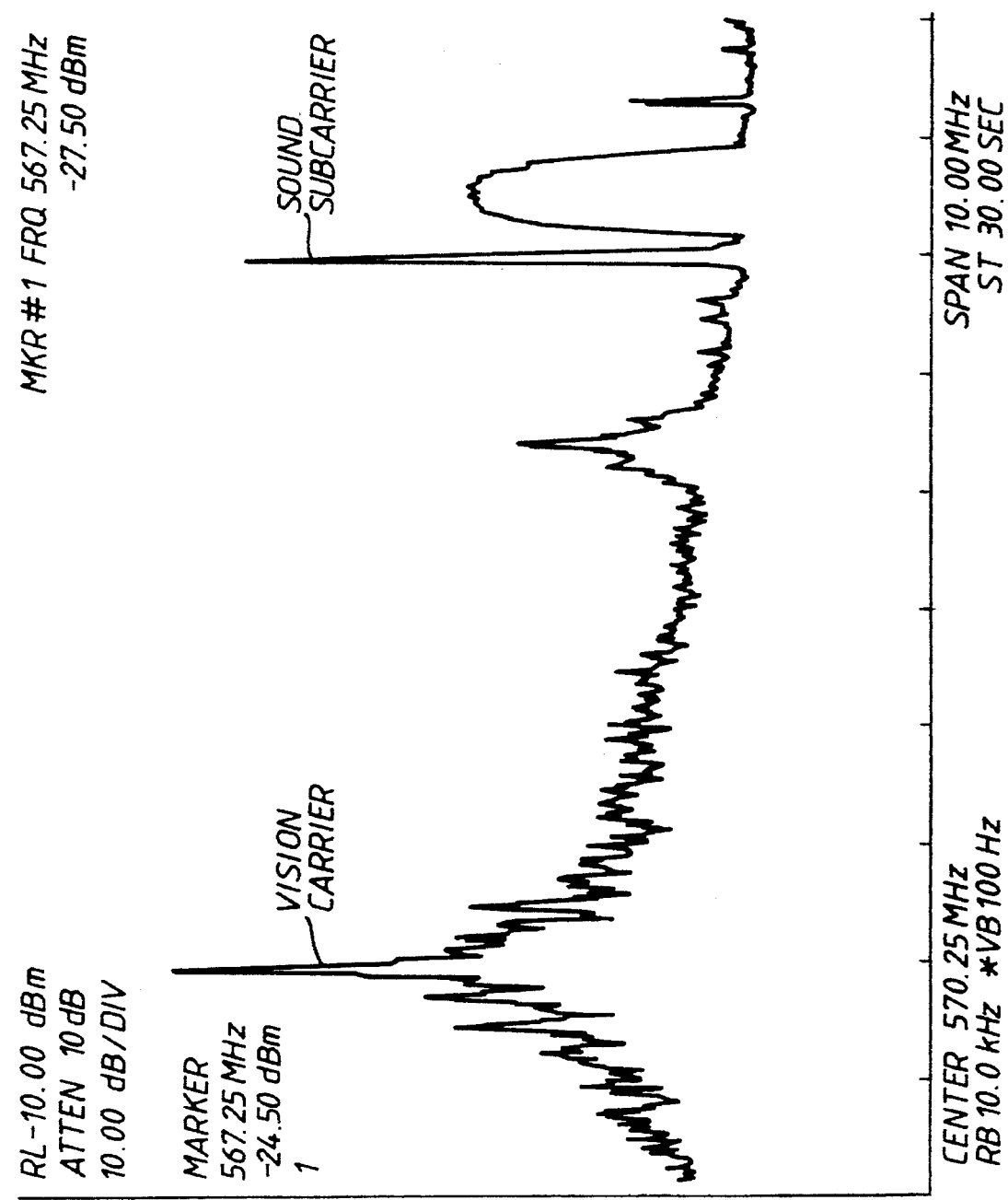
FIG. 2 shows the frequency spectrum of a typical television channel.
Figure 3:
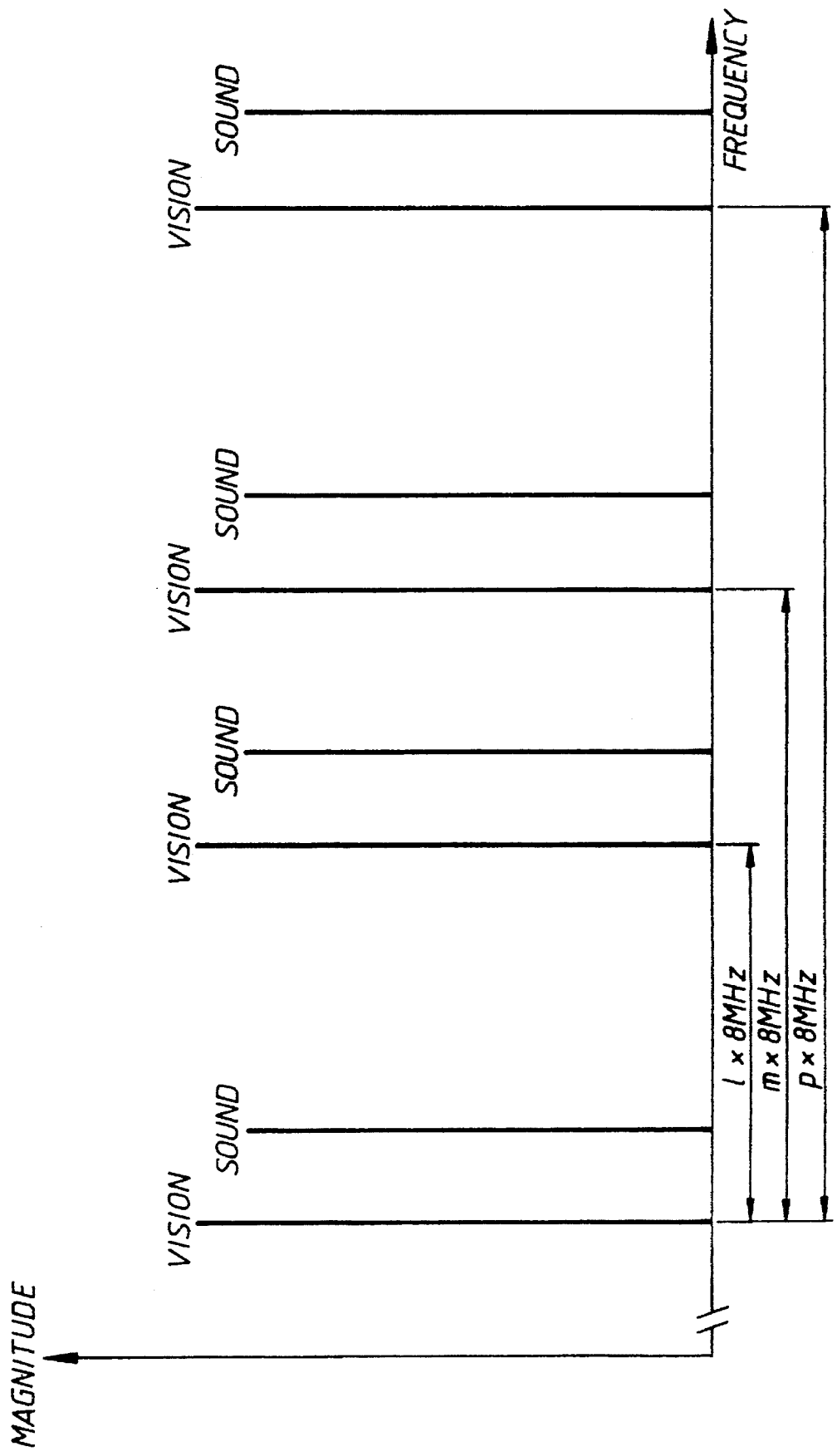
FIG. 3 shows an approximation to the frequency spectrum broadcast at a typical UK transmitter site.

As shown in FIG. 1a, an orthogonal frequency division multiplex (OFDM) signal consists of a large number of carriers each of which is modulated by a signal whose level varies discretely rather than continuously and thus the power spectrum of each modulated carrier follows a $(\sin/x)^2$ curve. The symbol rate of the modulating signals, and the carrier frequencies, are such that the peak of each modulated carrier occurs at a frequency corresponding to nulls for all of the other modulated carriers. The carrier spacing is equal to the reciprocal of the symbol rate of each modulating signal (assuming that all of the modulating signals have the same symbol rate).

The overall spectrum of the OFDM signal is very close to rectangular when a large number of carriers are contained in the OFDM signal.

During a time period, T, the OFDM signal may be represented by a block of N time domain samples. The value of the kth sample is, as follows:

$$x(k) = \sum_{n=0}^{n=N-1} X(n) e^{2jn k/N}$$

The N values $X(n)$ represent the respective values, during period T, of the discretely-varying signals which modulate the OFDM carriers $e^{2jnk/N}$.

It may be seen from the above equation that the OFDM signal corresponds to the inverse Discrete Fourier Transform of a set of data samples, $X(n)$. Thus, a stream of data may be converted into an OFDM signal by splitting the data stream up into blocks of N samples $X(n)$ and subjecting each block of data samples to an inverse Discrete Fourier Transform.

The succession of data samples, $X(n_i)$, which appear at a particular sample position $n_i$ over time constitute a discretely-varying signal which modulates a carrier at a frequency, $f_n$.

According to the present invention it is preferred to have only a restricted set of values which the samples $X(n)$ may take, the set of values representing a set of phase states and amplitudes to be imparted to carriers, fn. In particularly preferred embodiments of the invention the set values to which the samples $X(n)$ are restricted comprises values $+1+j, +1-j, -1+j$ and $-1-j$. This set of values corresponds to four allowable equally spaced phase states for the modulated carriers $f_n$, and the same amplitude. Thus, the modulation of each carrier, $f_n$, in these embodiments amounts to quadrature phase shift keying (QPSK). QPSK has the advantage of simplicity and good performance. Further advantages may be gained by differentially coding the data (this avoids the need for carrier references). An OFDM signal produced in this way will also tolerate non-phase-equalised channels much better than would conventional signals.

If the data to be QPSK modulated on to the OFDM carriers consists of data samples, each data sample taking one of the four possible levels, then it is relatively simple to code the input data into one of the four allowed modulating values $\pm 1 \pm j$. However, where this is not the case (for example, where the data consists of 3 (or more) bit data samples) then it is necessary to use an indirect process to code the input data into the four allowed sample values $\pm 1 \pm j$. One way of doing this is to first convert the input data into a binary bit stream and then to code each 2-bit portion of the four allowed values. Thus when converting a digital data stream into an OFDM signal, in which each OFDM carrier is QPSK modulated as described above, the data stream may be broken into block 2 n bits long and then each group of 2 bits may be coded into one of the four values $\pm 1 \pm j$.

Figure 8A:
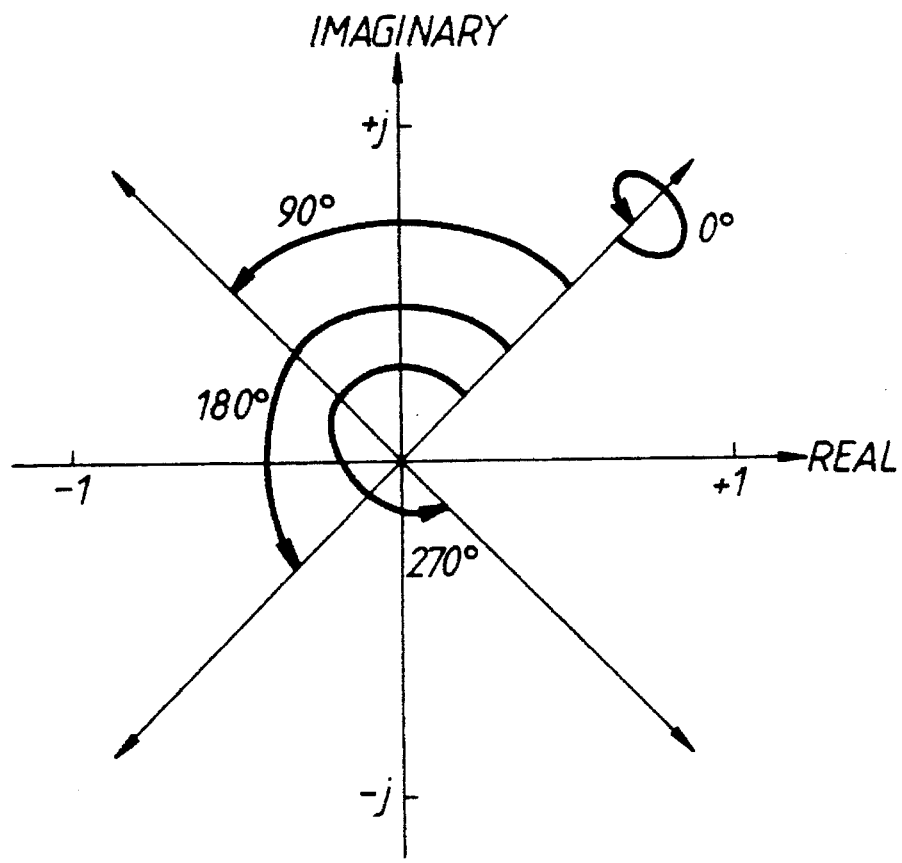
FIGS. 8a and 8b illustrate how 2-bit digital data samples may be differentially QPSK coded.
Figure 8B:
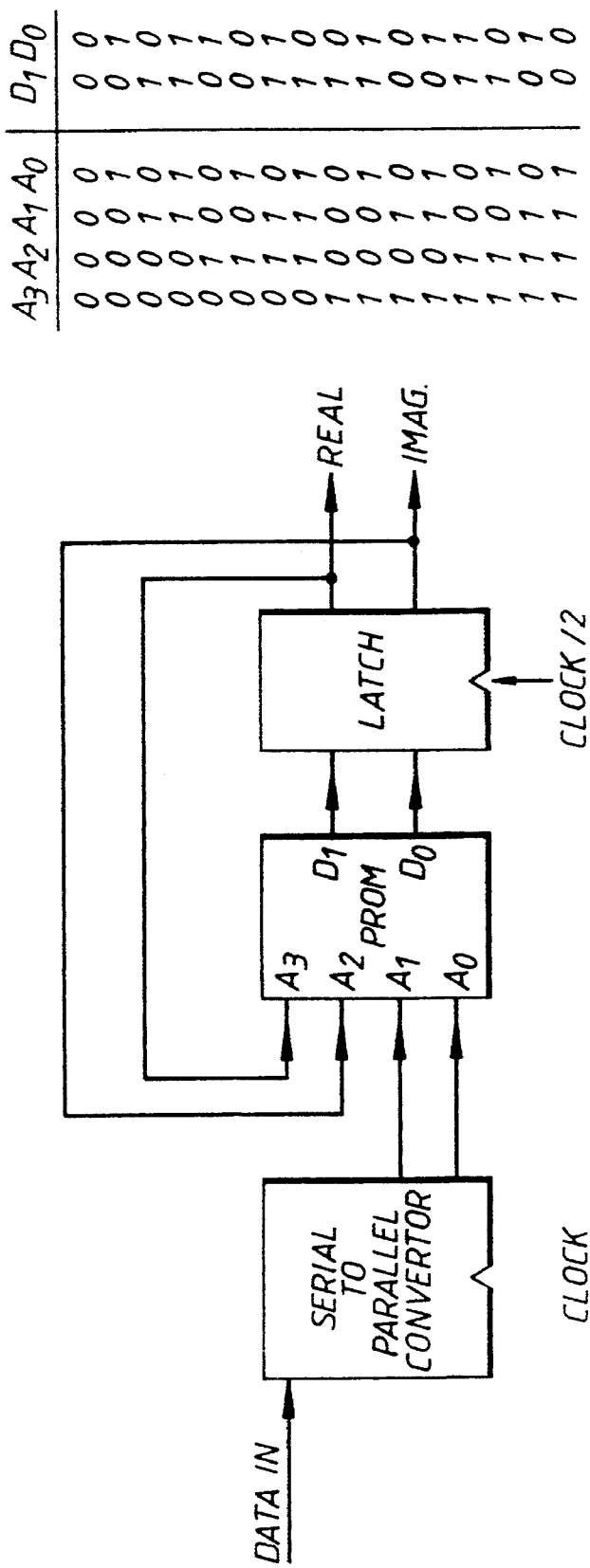

FIGS. 8a and 8b illustrate how 2-bit data samples may be differentially QPSK coded.

Figure 9A:
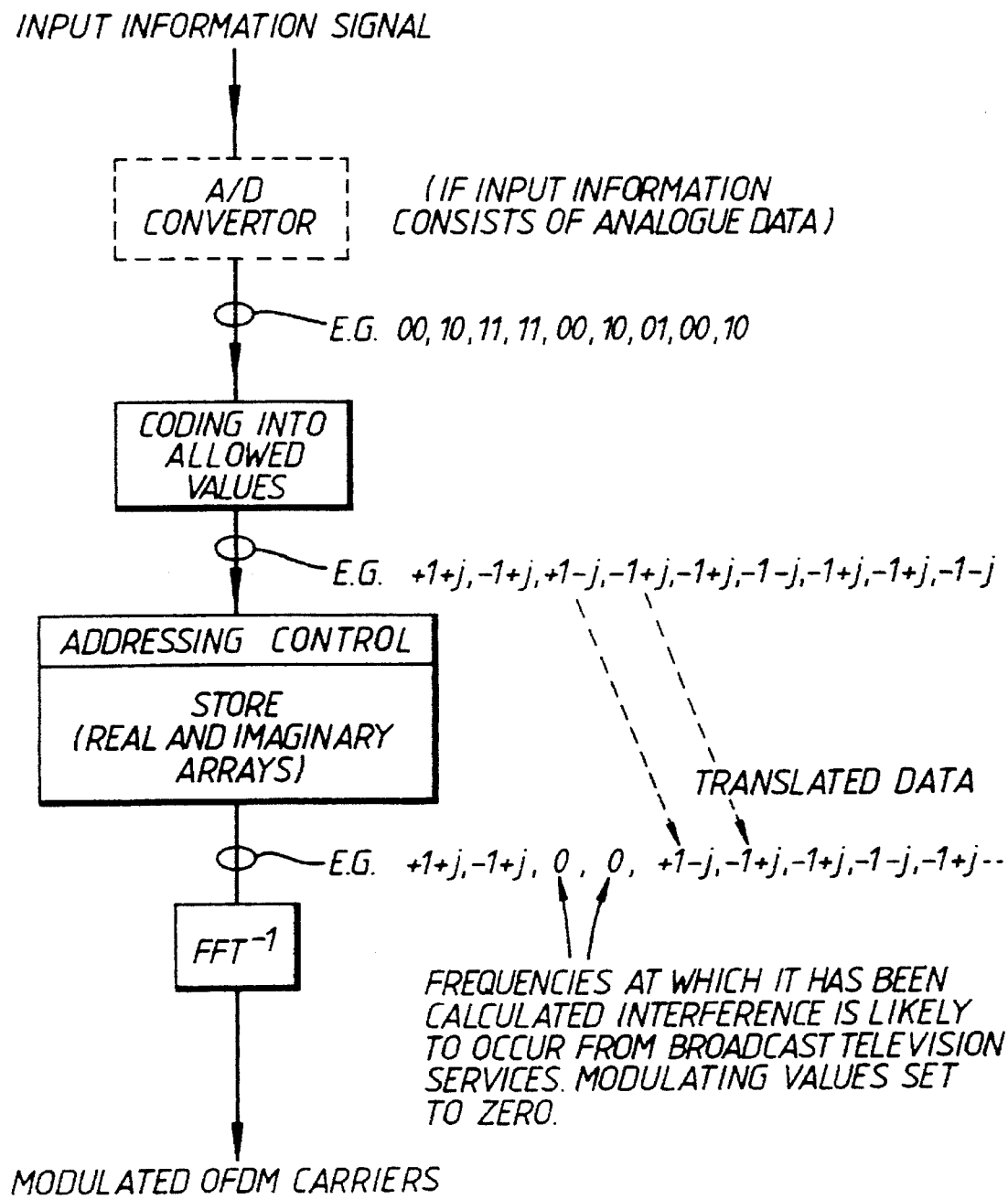
FIGS. 9a and 9b show in block diagrammatic form examples of coders according to the present invention.

Normally the resulting complex values for one block would be read into an array and the array of values would be subjected to an inverse Discrete Fourier Transform (inverse DFT) in order to produce an OFDM signal. However that would result in some useful data being modulated onto carriers which will be affected by interference from existing broadcast signals. According to the present invention it is preferred to read the complex values into locations in an array which correspond to the OFDM carriers which are not expected to experience significant interference and to insert zeros in the array location corresponding to OFDM carriers expected to experience interference. Since the frequency location of interferers can be calculated (as above) for any given broadcast frequency plan, the necessary addressing of the array can be built into the coder. FIG. 9a shows an example of a coder of this type in block diagrammatic form.

Figure 9B:
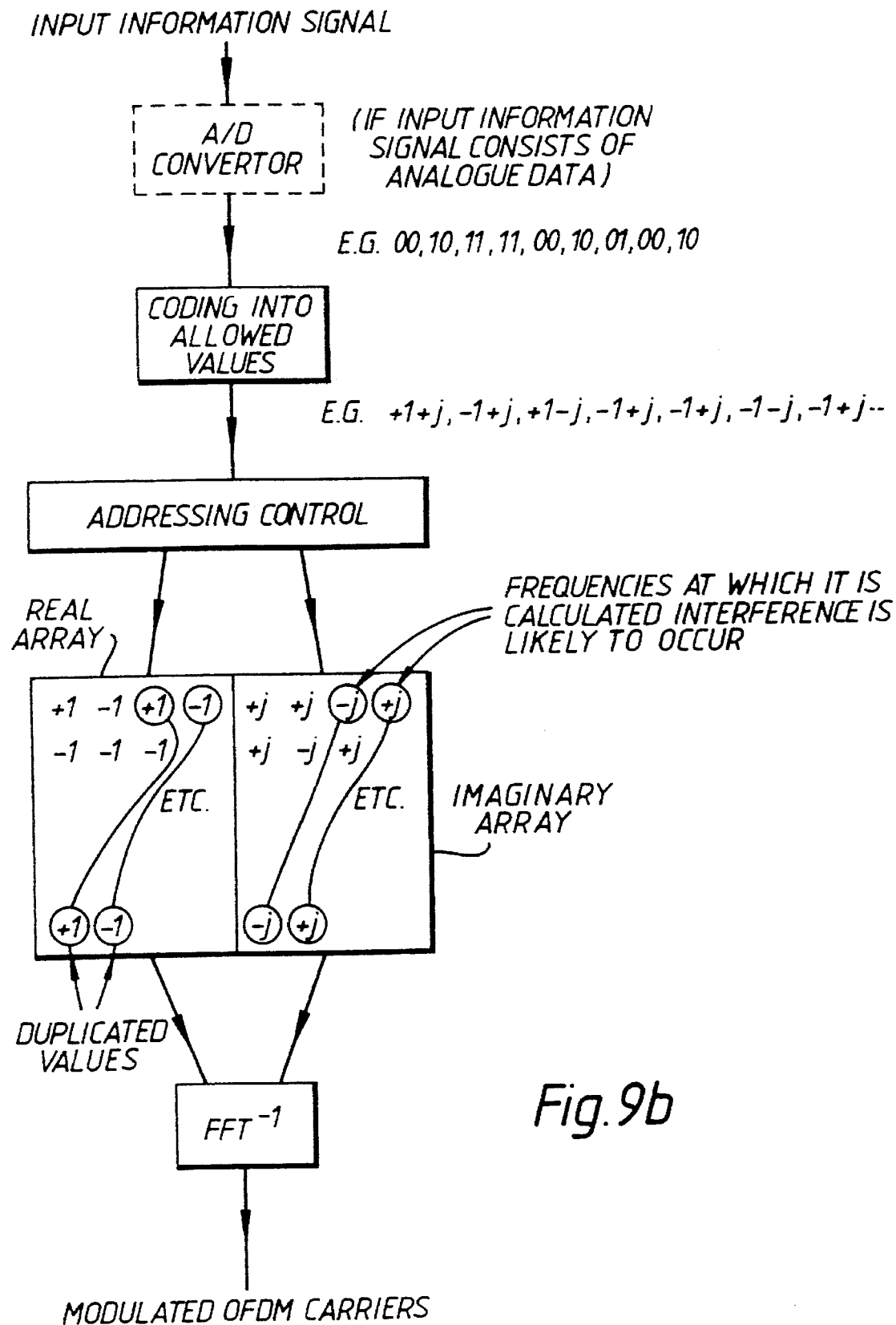

In an alternative coder according to the present invention the complex values for one block are written into successive locations in an array such that some useful data is modulated onto OFDM carriers which will be affected by interference. However the affected data samples will also have their complex values written into additional array locations (e.g. corresponding to the end of the block) so as to be transmitted to the receiver on at least two different OFDM carriers, at least one of which being relatively unaffected by interference. FIG. 9b shows an example of a coder of this type in block diagrammatic form. Clearly the frequency location of the duplicated information must be "known" to the receiver/decoder.

A consequence of using QPSK modulation of the carriers in the OFDM signal is that only two bits of data are "modulated onto" each carrier per inverse Discrete Fourier Transform. Without increasing the number of Fourier transformations this bit rate can be increased by increasing the number of allowed phase states and/or allowed amplitudes of the modulated carrier.

Figure 10A:
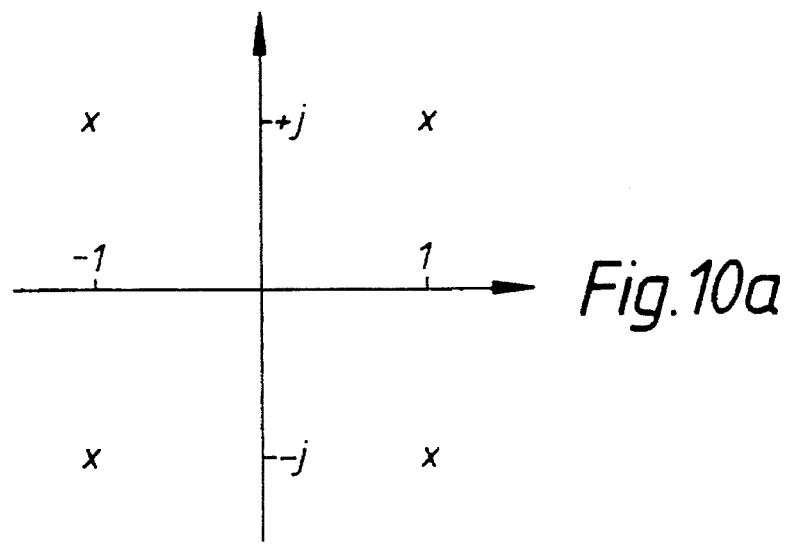
FIG. 10a illustrates the allowed values of a signal which is QPSK modulated.

An alternative way of looking at the proposed QPSK modulation scheme is to regard a particular carrier as being made up of an inphase (real) and a quadrature (imaginary) component. The amplitude of each is allowed to take one of two values—for example +1 and −1. 4-PSK could thus equally be called 4-QAM (quadrature amplitude modulation). The four legal phase states can be shown on a diagram as in FIG. 10a.

To generate a 4-PSK OFDM signal, values of +1 and −1 and +j and −j are read into real and imaginary arrays to which an inverse FFT is applied.

Figure 10B:
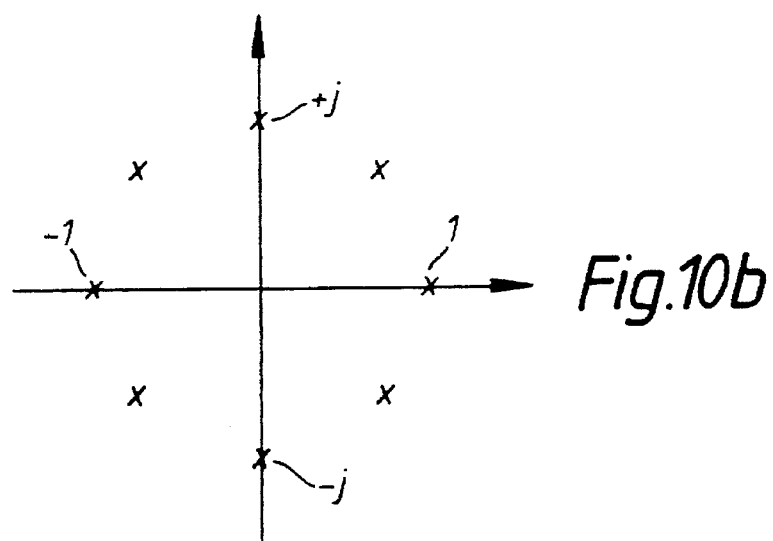
FIG. 10b illustrates the allowed values of a signal which is 8 PSK modulated.

If we wish to code more than two bits of information per carrier, it is possible to make use of more phase states and/or different carrier amplitudes. For n bits we must use $2^n$ states. An example is 8-PSK. In this case all the states are of the same amplitude, and are arranged equally around the circumference of a circle. With the axes shown in FIG. 10b, the coordinates of the states might be 1+j0, $1/\sqrt{2}+j/\sqrt{2}$ etc. The generate an OFDM signal all we have to do is to look up one of these eight sets of coordinates depending on the value of the 3 bits we wish to code and write those coordinates into the appropriate positions in the real/imaginary arrays before application of the inverse FFT. For differential coding a five input PROM may be used (2 inputs representing the coordinates of the last piece of data, and three inputs representing the 3 bits being coded).

PSK systems have the advantage that the receiver only needs to determine the phase of a received carrier—its amplitude is unimportant. For a given carrier power, however, the phase states quickly get very close together as the order of the modulation is increased. This implies that a given noise vector is more likely to cause an error.

Figure 10C:
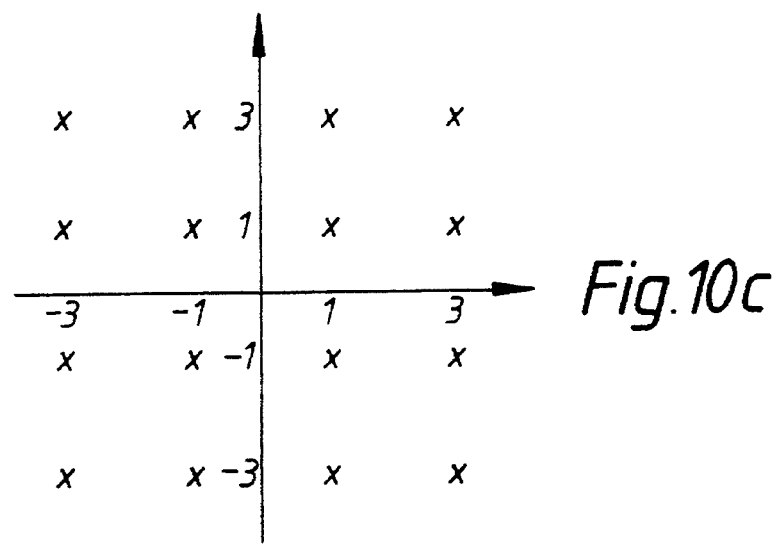
FIG. 10c illustrates the allowed values of a signal which is 16 QAM modulated.

Now consider 16 QAM. Since there are 16 allowed carrier states, each carrier codes 4 bits. The real and imaginary parts are each allowed one or four equally spaced values, leading to 16 possible states in all (see FIG. 10c).

Thus to generate a 16 QAM OFDM signal we could use values of −3,−1 ,+1, or +in the real array, and −3j , −j , +j , +3j in the imaginary array. Comparing 16 QAM with 16 PSK, we find that for the same bit error rate, 16 QAM requires about 4 dB less power. Although for a variety of reasons 16 QAM is more difficult to decode than 16 PSK, this noise advantage is likely to make it the system of choice if 4 bits/carrier are required.

Figure 11:
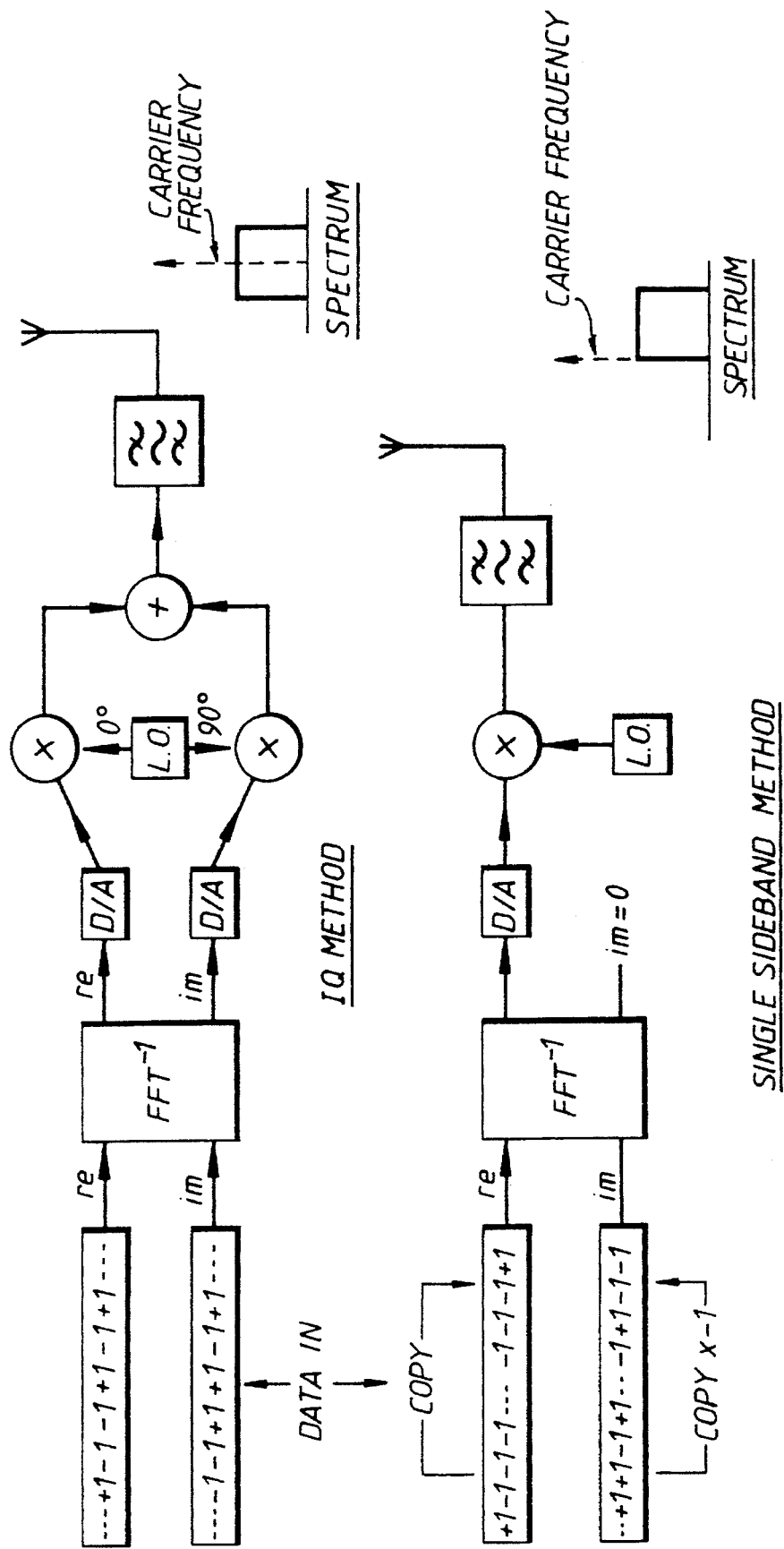
FIG. 11 illustrates two possible approaches to the modulation of an OFDM signal onto a carrier.

In general it will be necessary to modulate a generated OFDM signal onto a carrier so as to reach an appropriate frequency for broadcast. Two possible approaches to this are illustrated in FIG. 11.

The first approach uses two modulators fed with in-phase and quadrature local oscillator signals. One modulator handles the real part of the time domain signal, the other the imaginary part. The modulator outputs are summed and after suitable filtering the signal can be transmitted.

Although the first approach is workable we have developed a second approach because it provides certain advantages.

The second approach relies on producing a time domain signal with no imaginary part. To achieve this the real part of the frequency domain signal must be even symmetrical about its centre, while the imaginary part must be odd symmetrical. This may be achieved by writing data into only half of the available space in the real and imaginary arrays and copying data, with appropriate sign changes, into the other half of each array. At first sight it may seem that each FFT processes half as many data bits as in the first approach. In practice, however, it is possible to use each FFT to transform two sets of data at once with only a small loss in efficiency. This real signal can then be fed to a single modulator which produces a signal with two sets of sidebands symmetrical about the carrier. Since they contain no additional information, one set of sidebands can be filtered off, leaving a signal which occupies the same bandwidth per bit as the first approach.

This second approach, although slightly more complicated, has two advantages. Firstly, it simplifies the demodulator in the receiver since there is no need to accurately demodulate signals in quadrature.

Secondly, there is a simple baseband version of the OFDM signal, rather than the real and imaginary signals of the first approach. This is a considerable advantage because it is much simpler to distribute a baseband signal if it is a real signal.

As an example of the operation of the invention consider a coder in which a 1024 point FFT is used to generate an OFDM signal for transmission in the UK at frequencies where interference from existing TV services may be expected. In this example data will not be modulated onto the OFDM carriers likely to be affected by co-channel interference from the vision and sound carriers of the television service, nor onto OFDM carriers likely to experience adjacent channel interference (ie. carriers at the band edges).

Preferably the desired OFDM signal is generated in this example by setting to zero the signal (data sample values) modulating OFDM carriers 0–22, 50– 60, 424–454, 497–527, 570–600, 964–974 and 1002–1023.

It will be seen that the number of carriers being set to zero is double that which would be expected. This is because in this preferred version the real and imaginary arrays of the data sample values are tailored so as to produce a real baseband signal (as described above). Thus if a zero is inserted into the data sample array in respect of carrier n then the complex conjugate of zero (which also is equal to zero) must be inserted into the array of data sample values in respect of carrier (1023-n).

Also it will be seen that the "holes" being produced in the OFDM spectrum appear to be arranged backwards. This is because our example represents the likely practical situation that the OFDM spectrum will be reversed during the subsequent mixing stage.

Figure 12:
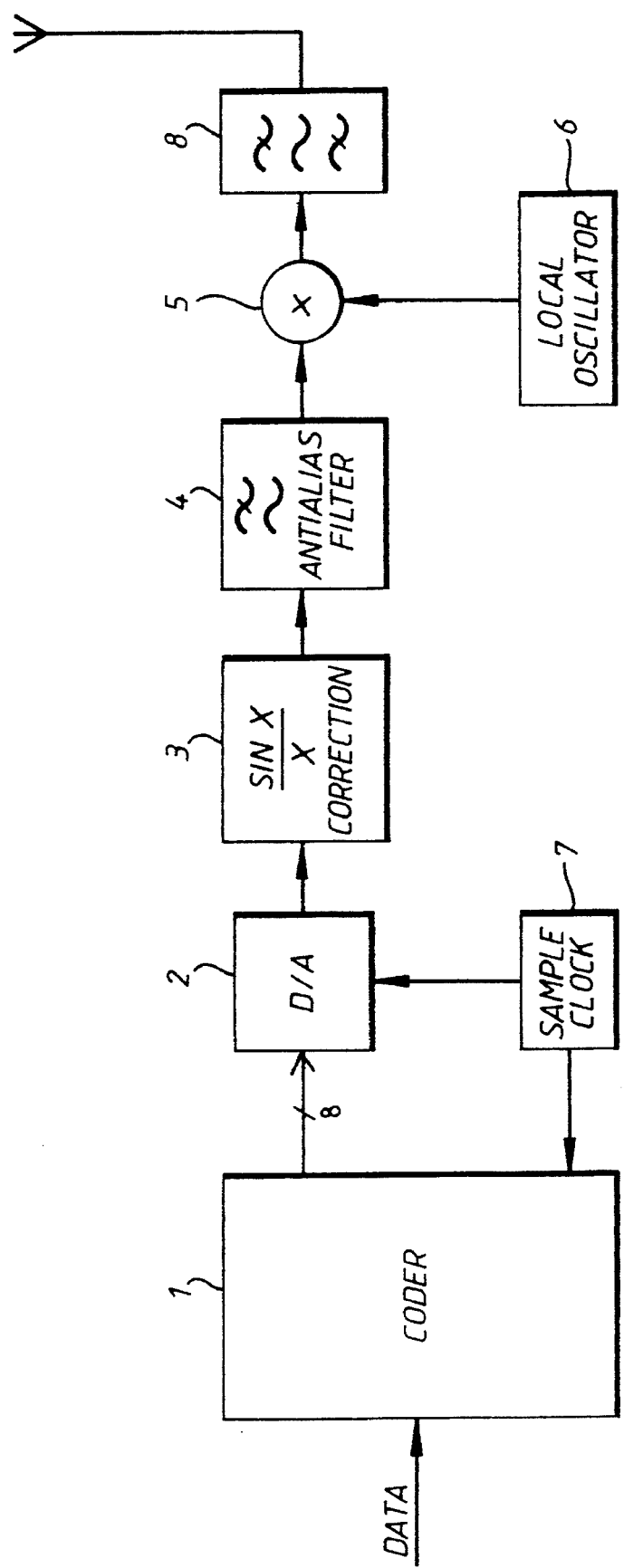
FIG. 12 is a simplified block diagram showing the transmission side of an embodiment of the invention.

FIG. 12 shows a simplified block diagram of an example of a whole transmission system for an information signal processed according to one embodiment of the invention using QPSK modulation. The output of the coder 1 feeds 8 bit samples to a D/A converter 2 at 16M samples/second. The output from this is sinx/x corrected 3 (as is usual for a signal that has been D/A converted) and filtered by a suitable anti-aliasing filter 4. The resulting baseband signal can then be mixed up to a higher frequency. The mixer 5 produces a double sideband suppressed carrier signal; subsequent filtering 8 removes one sideband before transmission.

Figure 13:
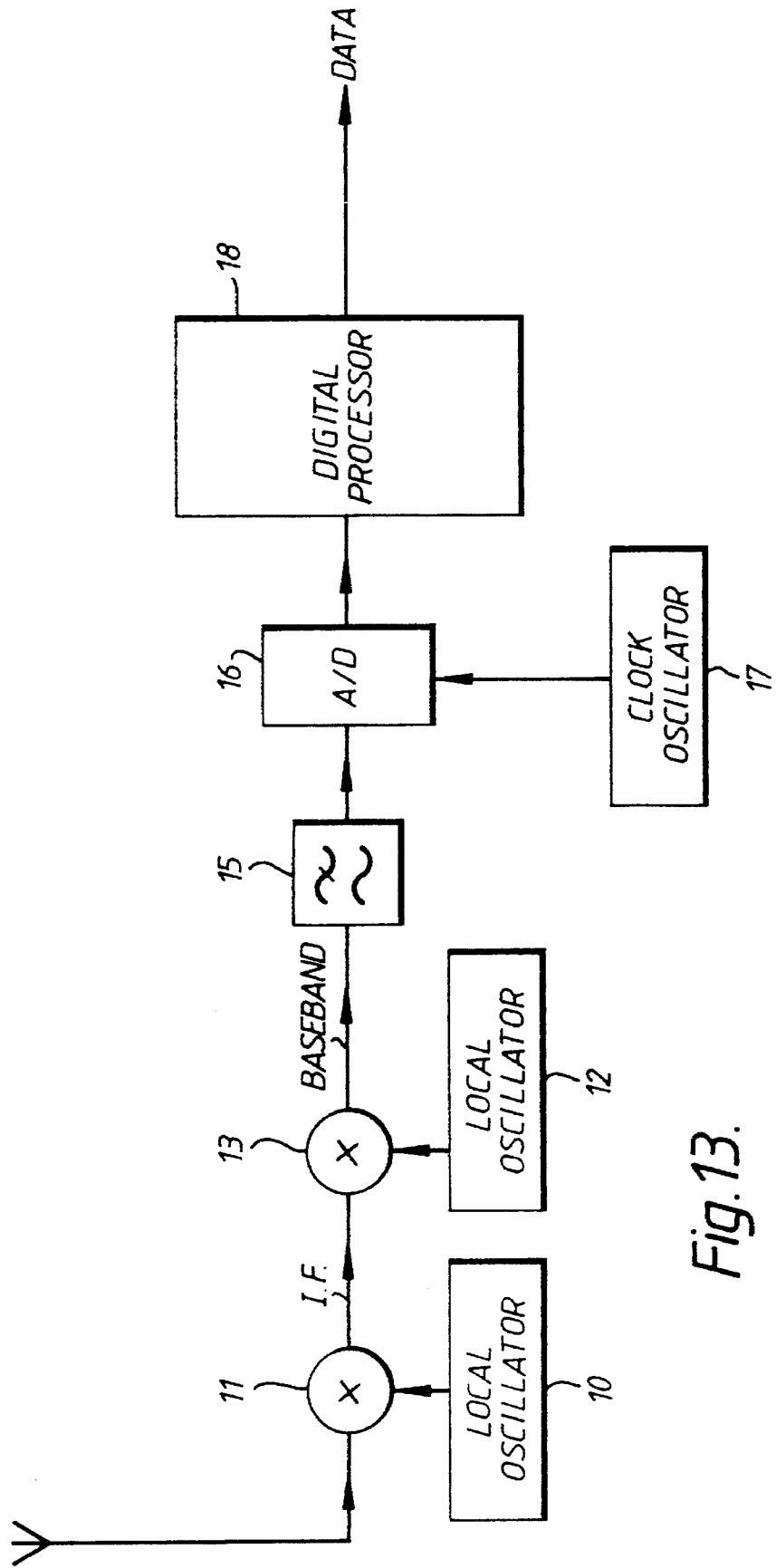
FIG. 13 shows a simplified block diagram of a receiver compatible with the transmitter of FIG. 12.

FIG. 13 shows a simplified block diagram of an example of a receiver complementary to an transmitter of FIG. 12. The incoming signal, which may, for example, be in the UHF band, is mixed down to an intermediate frequency in a mixer 11 and then down to baseband in a mixer 13, filtered in a filter 15 and converted to digital words by an analog-to-digital converter 16 and a digital processing device 18.

Assuming, for the moment, that the receiver is properly synchronised, ie. that receiver local oscillators, 10 and 12, and the digital sample clock, 17, are correctly locked to the transmitter, and that the receiver knows the position of the start samples in each data block, then the first part of the digital processing is that the Discrete Fourier Transform (DFT) of each block is taken. The output from the DFT will be a set of complex numbers which represents the amplitude and phase of a receiver OFDM carrier (which, where QPSK modulation is used, code two data bits).

(Information on synchronisation at the receiver is contained in copending British patent application 9020170.8).

As discussed above the information recovered at a receiver in respect of particular OFDM carriers will be affected by co-channel interference, adjacent channel interference, image channel interference and third order intermodulation products due to existing broadcast television signals. Various different measures may be adopted at the receiver in order to reduce the adverse affects of the interference. Firstly, since the frequency location of the interferers may be calculated for any given broadcast frequency plan, a receiver may be arranged so as to ignore information demodulated from particular OFDM carriers having frequencies at which it is calculated interference will occur. For example, a receiver intended for use in the United Kingdom may be designed to ignore the demodulated information occurring on OFDM carriers at 0 MHz and 6 MHz (affected by co-channel interference), at 2 and 4 MHZ (affected by third order intermodulation products) and at frequencies corresponding to the band edges (affected by adjacent channel interference).

This may be done, for example, by arranging for the demodulated information to be written into real and imaginary arrays and then reading out and decoding the stored real and imaginary values only from array locations corresponding to unaffected frequencies.

Figure 14:
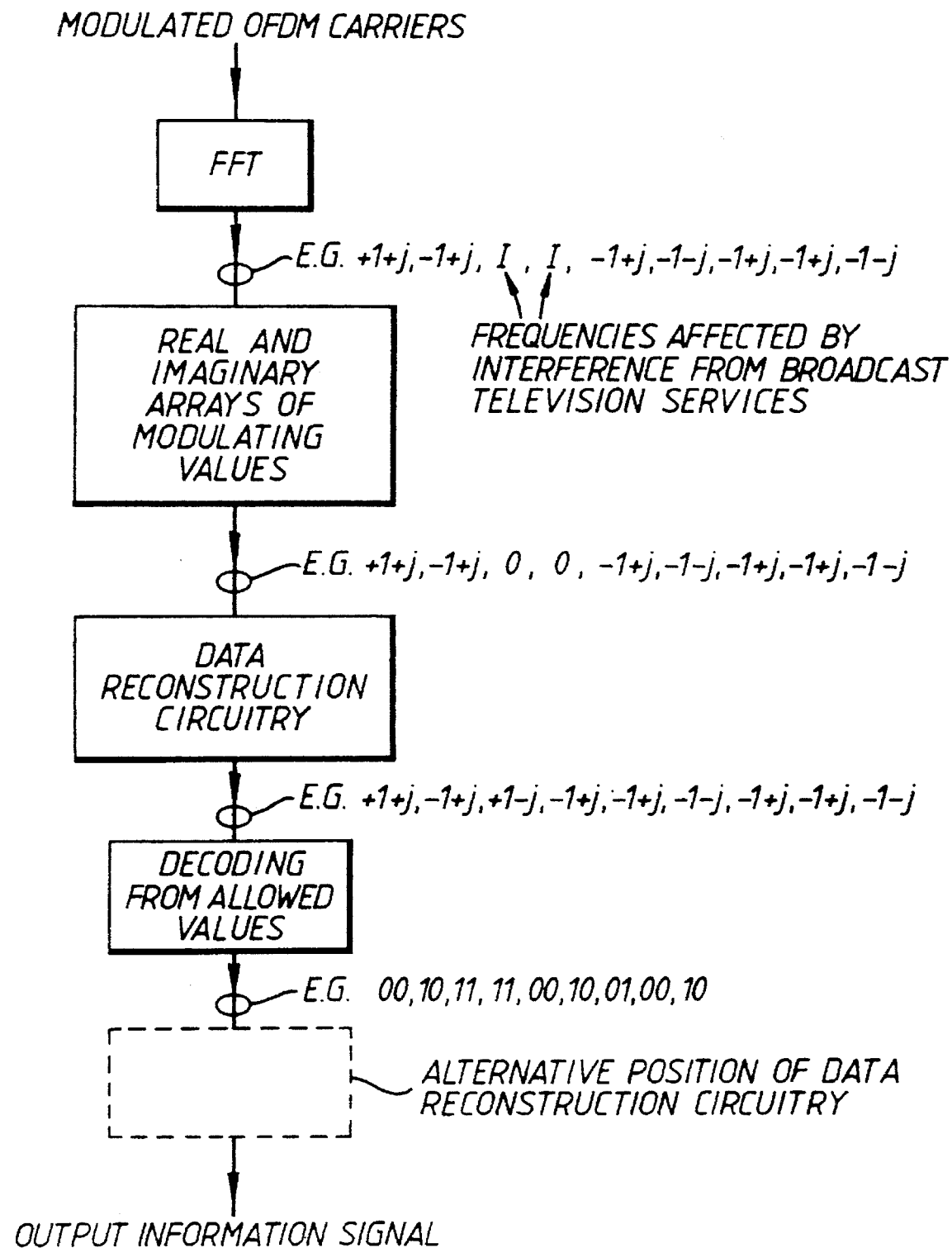
FIG. 14 shows in block diagrammatic form a decoder in one embodiment of a receiver according to the invention.

If the broadcast OFDM signal has been conditioned so as not to transmit any useful information modulating carriers at frequencies which the receiver is designed to ignore then a basic receiver of the above-mentioned type will be satisfactory. However, if useful information has been modulated onto those affected OFDM carriers (without being duplicated elsewhere in the OFDM signal) then the basic receiver will decode an incomplete set of data. In such circumstances it is preferable to include in the receiver some data reconstruction circuitry (e.g. interpolator apparatus) of known type in order to produce a full data signal. FIG. 14 illustrates in block diagrammatic form the structure of the decoder in such a receiver.

Figure 15:
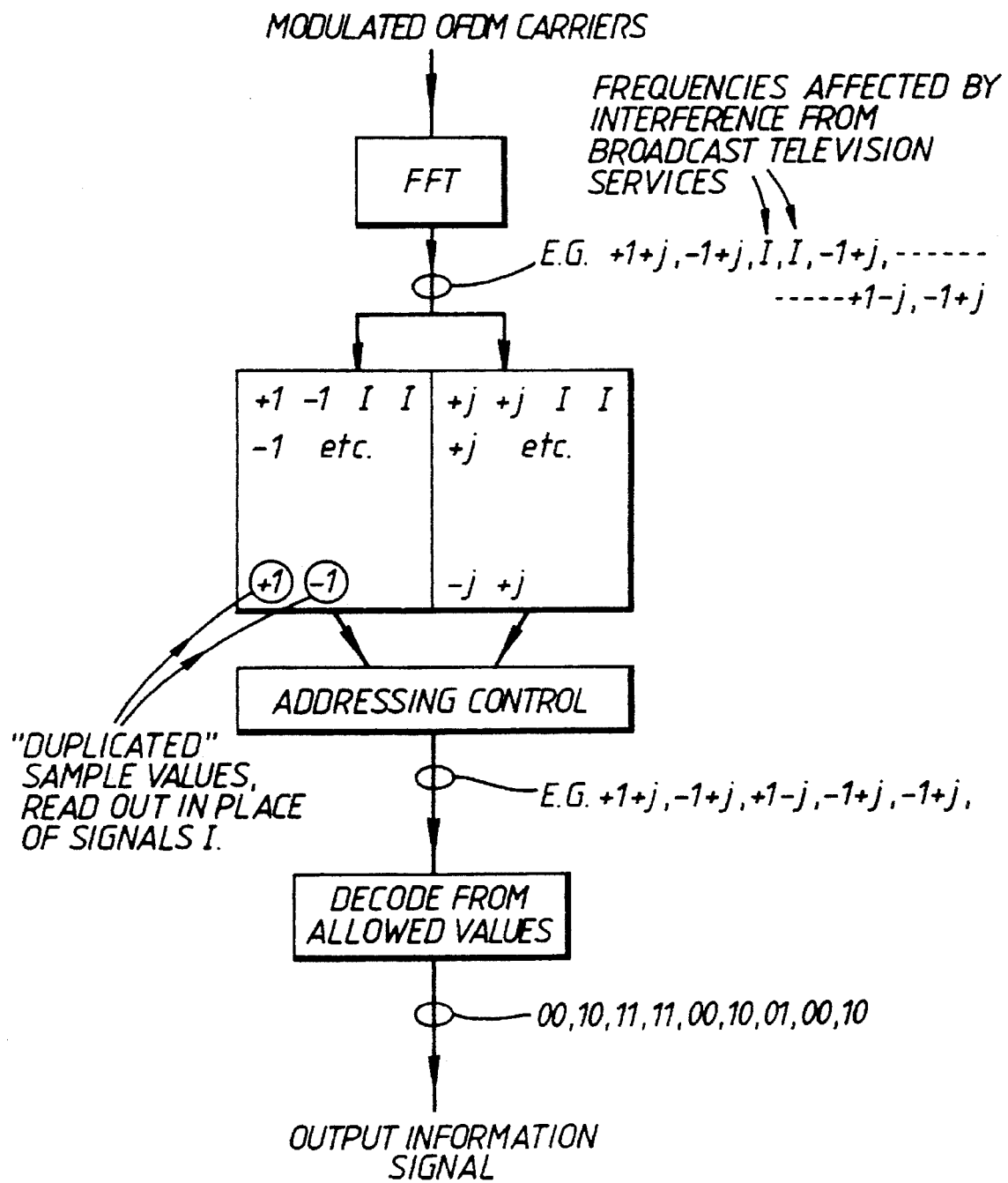
FIG. 15 shows in block diagrammatic form a decoder in another embodiment of a receiver according to the invention.

If the broadcast OFDM signal has been conditioned to duplicate at other frequencies in the signal the data modulated onto affected OFDM carriers, or if the data that should have been modulated onto the affected carriers has been translated to another part of the OFDM signal, then the receiver must demodulate this duplicated/translated information, translate it to the appropriate part of the data block and decode it. FIG. 15 shows a block diagram of the decoder in a receiver implementing this process. In other receiver embodiments the decoding step could take place before the data is translated to the correct location in the data block.

In order to reduce the effects of image channel interference an appropriate value should be selected for the local oscillator frequency and intermediate frequency to be used in the receiver superheterodyning process. As discussed above these frequencies should be chosen so that the OFDM carriers affected by the image channel vision and sound carrier frequencies will be the same as the OFDM carriers affected by co-channel interference from the ordinary vision carrier and sound carrier of the interfering broadcast television service.

Whilst the above description has been given in terms of the desired OFDM signal being generated through an inverse Discrete Fourier Transformation, it will be understood that a discrete Fourier Transformation could equally well be used (with an inverse DFT being used at the receiver to recover the data samples), or both the coder and decoder could use the same transformation (DFT, or inverse DFT) with appropriate further processing.

Using the techniques of the present invention it is possible to broadcast a low power OFDM signal, with a high data carrying capacity, in frequency bands likely to be affected by interference from existing broadcast television services. For example, in the UK where an 8 MHz channel is available for the OFDM signal, in an embodiment where holes are cut out of the OFDM spectrum at the positions corresponding to the vision carrier and sound carrier of an existing television service (to avoid co-channel interference) and at the band edges (to avoid adjacent channel interference) it is possible to obtain a data rate of 13.5M bit/sec using QPSK modulation of the OFDM carriers. At such a data rate it is practicable to transmit a high quality video signal via a low power OFDM signal. Using 16 QAM modulation of the OFDM carriers a data rate of 27M bit/sec may be obtained; that may be high enough to allow for HDTV transmission via a low power OFDM signal.

More generally, although the present invention has been described above largely in terms of transmitting an OFDM signal in an environment where it is subject to interference from television transmissions, the invention is considered to be more widely applicable to enable an OFDM signal to be transmitted where it may be affected by other sorts of transmissions.

Furthermore it is not only off-air OFDM transmissions that may be accommodated, the invention is considered to be applicable where the transmissions are carried in other media, e.g. coaxial cable.

We claim:

1. Apparatus for receiving an orthogonal frequency division multiplex (OFDM) signal transmitted at low power in a frequency band subject to interference from other transmissions, said OFDM signal comprising a plurality of OFDM carriers modulated by a block of samples, comprising:

means for demodulating the received OFDM carriers so as to produce a block of values representing the block of samples modulating said OFDM carriers;

means for decoding information contained in said sample values, the decoding means excluding from the decoding process sample values demodulated from OFDM carriers at frequencies likely to experience interference from said other transmissions; and means for outputting said decoded information.

2. Apparatus according to claim 1, wherein the decoding means excludes from the decoding sample values demodulated from OFDM carriers at one or more frequencies likely to experience co-channel interference from one or more respective carriers at a first frequency or group of frequencies likely to experience co-channel interference from the carrier of one of said other transmissions.

3. Apparatus according to claim 2, wherein said other transmissions comprise a television signal and said one or more carriers at one of said other transmissions comprise a vision carrier of the television signal.

4. Apparatus according to claim 3, said one or more carriers of one of said other transmissions comprise a second carrier of the television signal.

5. Apparatus according to claim 1, wherein the decoding means excludes from the decoding sample values demodulated from OFDM carriers at one or more frequencies likely to be affected by adjacent channel interference from said other transmissions.

6. Apparatus according to claim 1, wherein the decoding means excludes from the decoding sample values demodulated from OFDM carriers at one or more frequencies likely to be affected by third order intermodulation products attributable to said other transmissions.

7. Apparatus according to claim 1 and further comprising means for demodulating the modulated OFDM carriers from a further carrier signal by a heterodyne process.

8. Apparatus according to claim 7, wherein an intermediate frequency (IF) used in the heterodyne process is selected so as to ensure that an image channel interferer due to the carrier of one of said other transmissions affects OFDM carrier or carriers at a frequency or group of frequencies at one or more OFDM carriers modulated by sample values already being excluded from the decoding by the decoding means.

9. Apparatus according to claim 1, wherein the decoding means translates at least one demodulated sample value to a location within the block of a demodulated sample values which corresponds to demodulated sample excluded from the decoding.

10. Apparatus according to claim 3, further comprising means for demodulating the modulated OFDM carriers from a further carrier signal by a heterodyne process, an intermediate frequency (IF) used in the heterodyne process being selected so as to insure that an image channel interferer due to a further carrier of one of said other transmissions affects OFDM carriers at said one or more frequencies likely to experience co-channel interference from the vision carrier of the television signal.

11. Apparatus according to claim 4, further comprising means for demodulating the modulated ODFM carriers from a further carrier signal by a heterodyne process, an intermediate frequency (IF) used in the heterodyne process being selected so as to ensure that an image channel interferer due to a further carrier of one of said other transmissions affects OFDM carriers at said one or more frequencies likely to experience co-channel interference from the sound carrier of the television signal.

12. Apparatus according to claim 3, wherein said one or more carriers of one of said other transmissions comprises a vision carrier and a sound carrier of the television signal and further including means for demodulating the modulated OFDM signal from a further carrier signal by a heterodyne process, as intermediate frequency used in the heterodyne process being selected so as to ensure that image channel inteferers due to further carriers of one of said other transmissions affect OFDM carriers at one or more frequencies likely to experience co-channel interference from vision and sound carriers of the television signal.

13. Apparatus according to claim 1, wherein the decoding means comprises means for processing decoded sample values to derive data corresponding to sample values excluded from the decoding.

14. Apparatus according to claim 2, wherein the decoding means comprises means for processing decoded sample values to derive data corresponding to sample values excluded from the decoding.

15. Apparatus according to claim 5, wherein the decoding means comprises means for processing decoded sample values to derive data corresponding to sample values excluded from the decoding.

16. Apparatus according to claim 6, wherein the decoding means comprises means for processing decoded sample values to derive data corresponding to sample values excluded from the decoding.

17. Apparatus according to claim 2, wherein the decoding means translates at least one demodulated sample value to a location within the block of demodulated sample values which corresponds to a demodulated sample excluded from the decoding.

18. Apparatus according to claim 5, wherein the decoding means translates at least one demodulated sample value to a location within the block of demodulated sample values which corresponds to a demodulated sample excluded from the decoding.

19. Apparatus according to claim 6, wherein the decoding means translates at least one demodulated sample value to a location within the block of demodulated sample values which corresponds to a demodulated sample excluded from the decoding.

20. Apparatus for transmitting and receiving information in a frequency band subject to interference from other transmissions, comprising:

a transmitter, comprising:

means for inputting, in the form of blocks of digital data, the information to be transmitted;

means for coding each of the data samples in a block into one of a plurality of allowed values;

means for modulating a set of orthogonal frequency division multiplex (OFDM) carriers with the coded data sample values such that a data sample located in the block at a position corresponding to an OFDM carrier having a frequency identified as likely to experience interference is at least one of omitted and translated and duplicated to another location in the block, whereby another OFDM carrier having a frequency which is not identified as likely to experience is modulated; and means for transmitting a plurality of OFDM carriers modulated with the block of samples at a power which is low compared with the power of said other transmissions; and a receiver, comprising:

means for receiving the modulated OFDM carriers;

means for demodulating the received OFDM carriers so as to produce a block of values representing the block of samples modulating said OFDM carriers;

means for decoding information contained in said sample values, the decoding means excluding from the decoding process sample values demodulated from OFDM carriers at frequencies likely to experience interference from said other transmissions; and means for outputting said decoded information.

21. Apparatus for transmitting and receiving information according to claim 20, wherein said means for coding further includes means for storing and means for writing said coded data samples into said means for storing, and means for reading out said coded data samples of said means for storing to said modulating means, said means for writing including means for addressing coded data sample values so that no coded sample is written into a location in said means for storing that would be transmitted to said modulating means for modulating an OFDM carrier at a frequency identified as likely to experience co-channel interference from the carrier of one of said other transmissions; and wherein said decoding means excludes from the decoding sample values demodulated from OFDM carriers at one or more frequencies likely to experience co-channel interference from one or more respective carriers at a first frequency or group of frequencies likely to experience co-channel interference from the carrier of one of said other transmissions.

22. Apparatus for transmitting and receiving information according to claim 21, wherein said modulating means modulates the OFDM carriers using an array of real and array of imaginary values, the real array being even symmetrical about its center and the imaginary being skew symmetrical its center, for producing a real baseband signal, and said transmitter further comprising means for mixing the modulated OFDM carriers up to a further frequency for transmission.

23. Apparatus for transmitting information in a frequency band subject to interference from other transmissions, comprising:

a transmitter, comprising:

means for inputting, in the form of blocks of digital data, the information to be transmitted;

means for coding each of the data samples in a block into one of a plurality of allowed values;

means for modulating a set of orthogonal frequency division multiplex (OFDM) carriers with the coded data sample values such that a data sample located in the block at a position corresponding to an OFDM carrier having a frequency identified as likely to experience interference is at least one of omitted and translated and duplicated to another location in the block, whereby another OFDM carrier having a frequency which is not identified as likely to experience is modulated; and means for transmitting a plurality of OFDM carriers modulated with the block of samples at a power which is low compared with the power of said other transmissions.

24. Apparatus for transmitting information according to claim 23, wherein said means for coding further includes means for storing and means for writing said coded data samples into said means for storing, and means for reading out said coded data samples of said means for storing to said modulating means, said means for writing including means for addressing coded data sample values so that no coded sample is written into a location in said means for storing that would be transmitted to said modulating means for modulating an OFDM carrier at a frequency identified as likely to experience co-channel interference from the carrier of one of said other transmissions.

25. Apparatus for transmitting information according to claim 24, wherein said modulating means modulates the OFDM carriers using an array of real and array of imaginary values, the real array being even symmetrical about its center and the imaginary being skew symmetrical its center, for producing a real baseband signal, and said transmitter further comprising means for mixing the modulated OFDM carriers up to a further frequency for transmission.

* * * * *